US010775765B2

(12) United States Patent
Moersch et al.

(10) Patent No.: US 10,775,765 B2
(45) Date of Patent: Sep. 15, 2020

(54) DEVICE AND METHOD FOR MEASURING AND CONTROLLING A ROTARY-DRIVEN TOOL IN A MACHINE TOOL

(71) Applicant: Blum-Novotest GmbH, Gruenkraut (DE)

(72) Inventors: Norbert Moersch, Wangen (DE); Bruno Riedter, Weingarten (DE); Stefan Haefele, Tettnang (DE); Gregor Maier, Mochenwangen (DE)

(73) Assignee: BLUM-NOVOTEST GMBH (DE)

( * ) Notice: Subject to any disclaimer, the term of this patent is extended or adjusted under 35 U.S.C. 154(b) by 181 days.

(21) Appl. No.: 16/003,181

(22) Filed: Jun. 8, 2018

(65) Prior Publication Data

US 2018/0356788 A1 Dec. 13, 2018

(30) Foreign Application Priority Data

Jun. 9, 2017 (DE) .................. 10 2017 005 488

(51) Int. Cl.
*G05B 19/042* (2006.01)
*B23Q 17/24* (2006.01)
(Continued)

(52) U.S. Cl.
CPC ....... *G05B 19/402* (2013.01); *B23Q 17/0952* (2013.01); *B23Q 17/2466* (2013.01);
(Continued)

(58) Field of Classification Search
CPC ................ G05B 19/402; G05B 19/406; G05B 2219/50165; G01B 11/043; G01B 11/272
(Continued)

(56) References Cited

U.S. PATENT DOCUMENTS

| | | | | |
|---|---|---|---|---|
| 2011/0066277 A1* | 3/2011 | Mann | ................ | B23B 29/125 700/174 |
| 2013/0164092 A1* | 6/2013 | Kondo | ................ | G05B 19/404 409/132 |
| 2015/0306720 A1* | 10/2015 | Ono | ................ | B23Q 15/12 700/174 |

FOREIGN PATENT DOCUMENTS

| | | | |
|---|---|---|---|
| DE | 4238504 A1 | | 5/1994 |
| DE | 102013011307 A1 | * | 1/2015 |

OTHER PUBLICATIONS

Rall,K. et al.: "Vermessung rotierender Werkzeuge in HSC-Fräsmaschinen," ZWF 93 (1998) 4, pp. 127ff.

* cited by examiner

*Primary Examiner* — Robert E Fennema
*Assistant Examiner* — Jigneshkumar C Patel
(74) *Attorney, Agent, or Firm* — Tarolli, Sundheim, Covell & Tummino LLP

(57) ABSTRACT

A processing unit for measuring and controlling a rotary-driven tool, wherein the processing unit is connectable to a light barrier arrangement, which comprises a light-transmitting unit and a light-receiving unit, wherein the processing unit is configured to receive from the light-receiving unit signals that are at least approximately proportional to shading generated by the rotary-driven tool and/or at least one cutting edge of the rotary-driven tool at a first measuring position. The processing unit is further configured to evaluate the signals received and to transmit control signals to the light barrier arrangement, wherein the evaluation of the signals received by the processing unit comprises the following steps: determination of an interference signal component and/or a useful signal component of the received signal; and provision of information about the useful signal component, the interference signal component and/or the
(Continued)

received signal for forwarding to a numerical controller of a machine tool.

43 Claims, 11 Drawing Sheets

(51) Int. Cl.
*G05B 19/4065* (2006.01)
*B23Q 17/09* (2006.01)
*G01B 11/04* (2006.01)
*G01B 11/27* (2006.01)
*G05B 19/406* (2006.01)
*G05B 19/401* (2006.01)
*G05B 19/402* (2006.01)

(52) U.S. Cl.
CPC ........ *B23Q 17/2485* (2013.01); *G01B 11/043* (2013.01); *G01B 11/272* (2013.01); *G05B 19/406* (2013.01); *G05B 19/4065* (2013.01); *G05B 2219/37227* (2013.01); *G05B 2219/37415* (2013.01); *G05B 2219/50165* (2013.01)

(58) Field of Classification Search
USPC .......................................................... 700/160
See application file for complete search history.

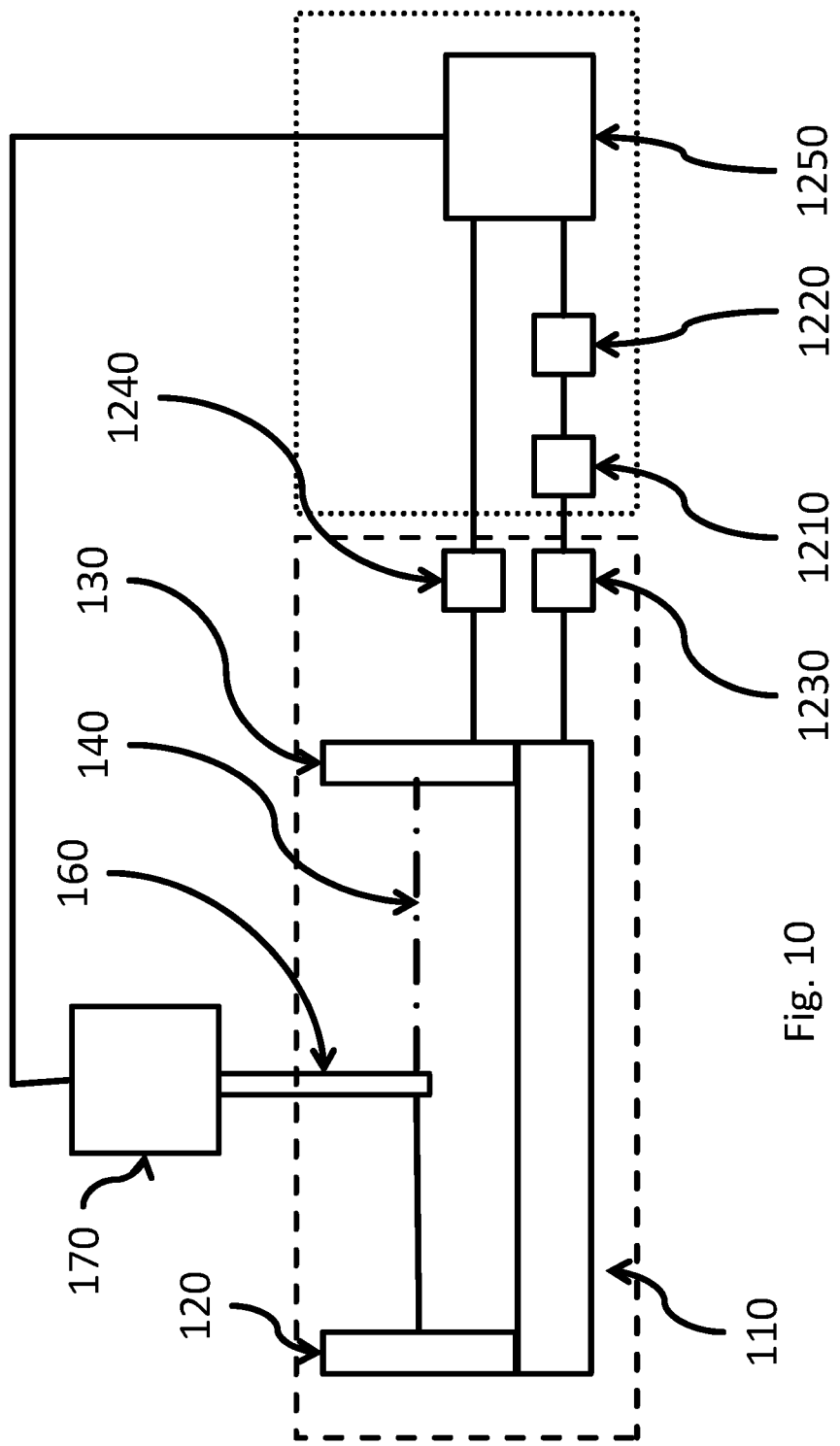

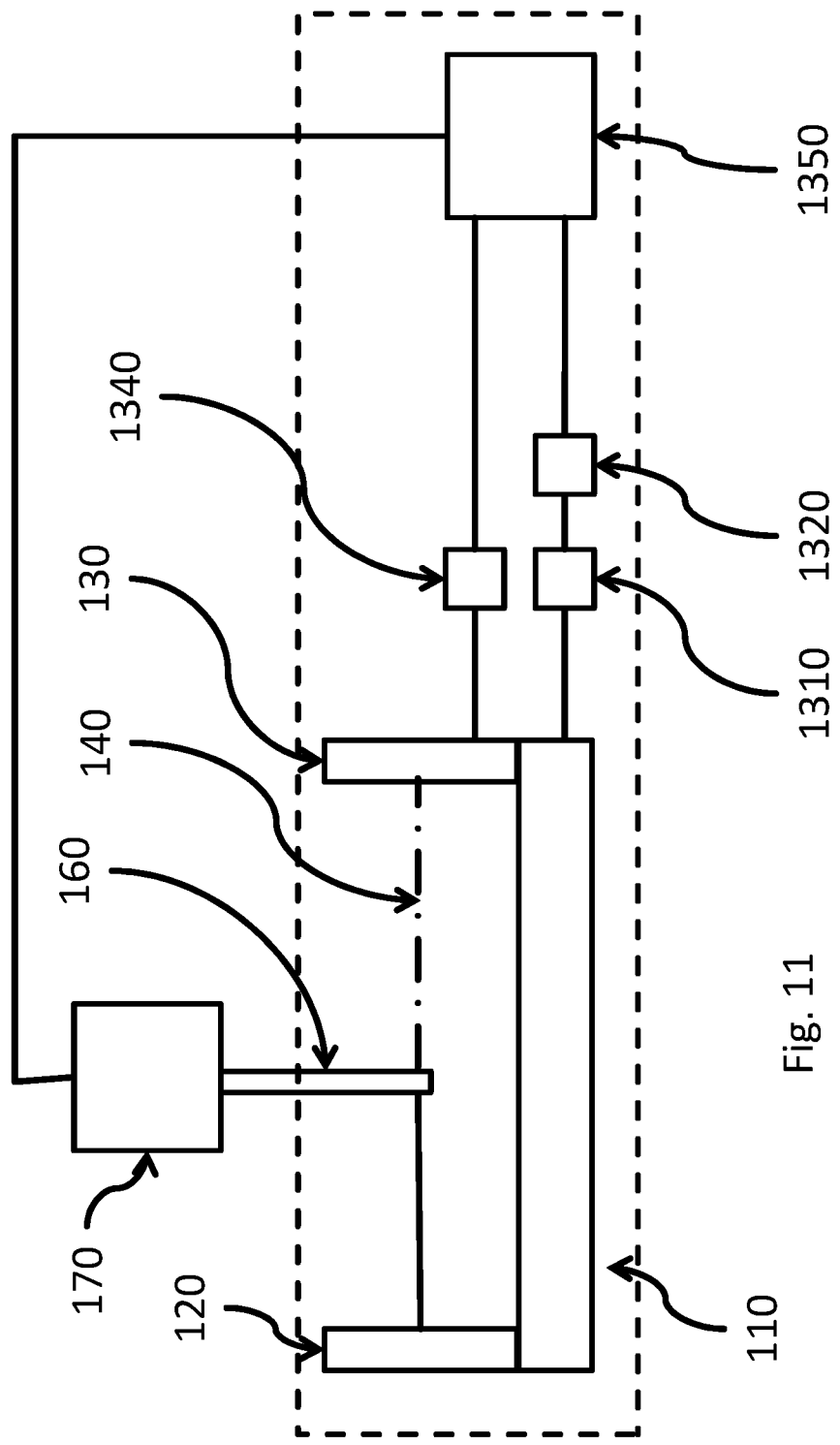

DEVICE AND METHOD FOR MEASURING AND CONTROLLING A ROTARY-DRIVEN TOOL IN A MACHINE TOOL

RELATED APPLICATIONS

The present invention is a U.S. non-provisional patent application, claiming priority to DE 10 2017 005 488.6, filed on 9 Jun. 2017, the entirety of which is incorporated herein by reference.

BACKGROUND

Rotary-driven tools used in machine tools often exhibit concentricity errors or damage, which may be present even before use in the machine tool or can also arise subsequently due to wear of the same.

Concentricity errors or damage to the rotary-driven tool can lead to stresses in the tools that damage or destroy these during machining. In machining processes with small tolerances, concentricity errors of less than 0.01 mm can lead to defective machining and thus to rejects in the production process.

To recognize possible concentricity errors or damage to the rotary-driven tool, one possible approach is to set the rotary-driven tool, clamped in the machine tool, in rotation and measure it using an optical measuring system, for example in the form of a laser light barrier. In this process a signal is generated by shading caused by the rotary-driven tool in a light beam of the laser light barrier, which signal is processed to determine a parameter, for example a radius of the rotary-driven tool, and compare it with a reference radius. A possible concentricity error can be detected based on the comparison.

This approach presupposes that the shading generated by the rotary-driven tool in the light beam was only generated by the rotary-driven tool. This has the disadvantage that, above all when the rotary-driven tool is in use, swarf, cleaning fluid and/or coolant, for example, can have an influence on the shading of the light beam that is generated, so that the resulting signal reproduces an incorrect radius, for example. The vibrations produced by the operation of the machine tool, which can lead to a distorted signal, are another influencing factor. The consequence of the possibly excessive deviation from the reference radius would be that the rotary-driven tool would be exchanged or stopped, leading in turn to a stoppage of the machine tool. The consequences of the stoppage of the machine tool are lower production efficiency.

PRIOR ART

In "Measurement of rotary tools in HSC milling machines" by K. Rall et al. in ZWF 93, year 1998, volume 4, pages 127 to 130, a method is described for determining the effective contour of a tool using a laser light barrier. In this the tool is rotated and moved transversely to the measuring beam of the laser light barrier. Measuring positions are determined that specify the entry of the tool into and its exit from the light beam. The effective diameter of the tool is determined from the difference in these measuring positions. This process is repeated following each axial displacement of the tool until the entire effective contour of interest is known.

DE 42 38 504 A1 shows a method for measuring a tool in a spindle of a machine tool, in which the tool is fed by relative movement between a spindle stock taking up the spindle and a workpiece table. The relative position of the spindle stock to a reference point is determined by a position measuring system, wherein the tool is fed in the direction of one of its coordinates to an optical measuring plane, with associated optical measuring system, running substantially transversely to the coordinate. The measuring system emits a measuring signal, with reference to which it is determined whether the tool interrupts the measuring plane. On interruption by the tool of the measuring plane, the relative position of the spindle stock is measured as a position measuring value and the dimensions of the tool are calculated from the position measuring value and from the relative position of the measuring plane.

In the case of these known devices/methods, a rotating or stationary tool clamped in the tool spindle of the machine tool is guided in a longitudinal or transverse direction into a laser beam or out of the laser beam.

Here the tool and the laser beam are moved relative to one another. The beam shading caused by the tool is measured and a switching signal is output in the event of defined shading. At the time of this switching signal the position of the respective machine axis is measured. The measured value corresponds e.g. to the maximum tool radius or the maximum tool length. Since in this type of measurement with a rotating tool the ratio between feed and speed specifies the achievable accuracy, the tool must be moved at a very small feed rate relative to the laser beam for precise measurement. Following the first registration, for example, of the switching signal, which indicates the tool radius, the measurement is normally repeated once or more for signal confirmation or for mean value formation. The measuring process as a whole for a tool therefore requires a relatively large amount of time.

Object

Starting out from the approaches described above, the problem consists in providing a device for measuring and controlling a rotary-driven tool, which device distinguishes between a switching signal corresponding to the rotary-driven tool and a switching signal caused by contamination or disruption.

Another problem consists in increasing the process reliability when measuring and controlling a rotary-driven tool while at the same time reducing the measuring time necessary for the measuring process.

Proposed Solution

For the solution a processing unit for measuring and controlling a rotary-driven tool is proposed. The processing unit is connectable to a light barrier arrangement, which comprises a light-transmitting unit and a light-receiving unit, wherein the processing unit is configured to receive from the light-receiving unit at a first measuring position signals that are at least approximately proportional to shading generated by the rotary-driven tool and/or at least one cutting edge of the rotary-driven tool. The processing unit is further configured to evaluate the signals received and to transmit control signals to the light barrier arrangement, wherein the evaluation of the signals received by the processing unit comprises the following steps: determination of an interference signal component and/or a useful signal component of the received signal; and provision of information about the useful signal component, the interference signal component and/or the received signal for forwarding to a numerical controller of a machine tool.

A frequency and/or amplitude of the signal can be predefined, wherein the processing unit is configured to determine the interference signal component and/or the useful signal component based on the predefined frequency and amplitude.

The processing unit can be configured to determine a useful signal component, an interference signal component and/or the received signal repeatedly.

The processing unit can be configured to record and store the repeatedly determined useful signal components over a longer period and, based on the higher data quantity, to execute an averaging of the useful signal components, in order to increase the accuracy and process reliability of the repeatedly determined useful signal components.

The processing unit can be configured to compare the repeatedly determined useful signal components with one another and to determine a measuring position error based on the comparison. The processing unit is further configured to determine a second measuring position based on the measuring position error, wherein the light-receiving unit generates signals at the second measuring position that are at least approximately proportional to the shading generated by the rotary-driven tool and/or the at least one cutting edge of the rotary-driven tool.

Alternatively the processing unit can be configured to superpose the repeated useful signal components, interference signal components and/or received signals, to apply a task-specific block filter to the superposed useful signal components, interference signal components and/or received signals, to determine a representative value of the useful signal components, the interference signal components and/or the received signals based on the superposed useful signal components, interference signal components and/or received signals and to provide information about the representative value of the useful signal components, interference signal components and/or received signals for forwarding to the numerical controller of the machine tool. The task-specific block filter can be executed as a median value filter, a minimum value filter, a maximum value filter or a mean value filter or a combination of these filter types.

The processing unit can be configured to determine a form and/or a length of the rotary-driven tool and/or of the at least one cutting edge based on the useful signal component, the interference signal component and/or the received signal and to provide information about the form and/or length of the rotary-driven tool and/or of the at least one cutting edge to the numerical controller of the machine tool. The length of the rotary-driven tool should be understood as a geometrical dimension of the rotary-driven tool. On cutting tools the geometrical dimension is the effective cutting diameter and/or the effective cutting length, on grinding tools it is the effective grinding diameter and/or the effective grinding length, on thread formers it is the effective thread diameter and/or the effective thread insert length, on cylindrical reference tools it is the effective reference diameter and/or the effective reference length of the rotary-driven tool.

To determine the form and/or the length, the processing unit can here access a predefined calibration function, which specifies a connection between shading generated by the rotary-driven tool and/or the at least one cutting edge and an associated, at least approximately proportional signal.

The calibration function describes the direct connection between the generated shading of an object interrupting the measuring beam and an associated, at least approximately proportional signal received at the light-receiving unit. The connection is determined by a calibration process described as linearization of the measuring beam and described by a linearization characteristic. The calibration process can take place either by incremental interruption of the measuring beam by a reference object or by a continuous, slow interruption by a reference object of the measuring beam at a constant rate, wherein the connection between the shading generated and an associated, at least approximately proportional signal is created between a minimal shading and a maximal shading. In both cases the reference point (zero value) of the linearization characteristic is ideally set at the mean shading between the minimal shading and the maximal shading. This reference point is identical with the position of the respective machine axis at the time of the switching signal, which is output by the beam shading caused by the tool at a defined shading.

Since the connection between the shading of the object interrupting the measuring beam and the at least approximately proportional signal is a function of the direction of the object interrupting the measuring beam on account of non-ideal properties of the measuring beam, it is recommended to execute a calibration process for each direction of the objects interrupting the measuring beam. The linearization characteristics determined by the calibration process are stored in the processing unit in the form of a table and or in the form of a polynomial function separately for each calibration direction.

Furthermore, based on the determined form and/or length of the rotary-driven tool, the processing unit can execute tool identification by comparing the determined form and/or length with a predefined form and/or length of known tools.

Alternatively the processing unit can be configured to determine a local maximum of the shading of the rotary-driven tool and/or of the at least one cutting edge, in order to determine a length of the rotary-driven tool and/or of the at least one cutting edge by using the predefined calibration function and to provide information about the length of the rotary-driven tool and/or of the at least one cutting edge for forwarding to the numerical controller of the machine tool.

To determine a symmetrical or approximately symmetrical signal area of the signal, the processing unit can be configured to fit the symmetrical or approximately symmetrical signal area with a sinusoidal regression, a polynomial regression, a Gaussian regression and/or an exponential smoothing and to determine the local maximum in the symmetrically or approximately symmetrically fitted signal area.

The processing unit can be configured to determine the local maximum by means of peak value detection.

The processing unit can determine a contamination and/or an imperfection of the rotary-driven tool or of the at least one cutting edge based on the useful signal component and/or the interference signal component. If the processing unit determines a contamination, the processing unit is configured to provide information about a cleaning signal for cleaning of the contaminated rotary-driven tool and/or of the at least one cutting edge for forwarding to the numerical controller of the machine tool and, if the processing unit determines an imperfection, to provide information about a warning signal for forwarding to the numerical controller of the machine tool.

The rotary-driven tool can have a plurality of cutting edges, which generate shadings of the light beam, wherein the light-receiving unit produces for the shadings at least approximately proportional signals reproducing these.

The processing unit can be configured to identify a shortest and a longest cutting edge based on useful signal components of the signals received and to provide information about the identified shortest and longest cutting edge for forwarding to the numerical controller of the machine tool.

Furthermore, the processing unit can be configured to determine a concentricity error of the rotary-driven tool based on the identified shortest and longest cutting edge if useful signal components and/or interference signal components of repeatedly received signals deviate from one another by a predetermined value.

The rotary-driven tool can likewise have an approximately cylindrical surface and/or an approximately level front face, which generate shadings of the light beam, wherein the light-receiving unit produces for the shadings at least approximately proportional signals reproducing these.

The processing unit can be configured to identify a smallest and a largest geometrical dimension of the approximately cylindrical surface and/or of the approximately level front face based on useful signal components of the signals received and to provide information about the identified smallest and largest geometrical dimension for forwarding to the numerical controller of the machine tool.

Furthermore, the processing unit can be configured to ascertain a concentricity error and/or an axial run-out error of the rotary-driven tool based on the identified smallest and largest geometrical dimension if useful signal components and/or interference signal components of repeatedly received signals deviate from one another by a predetermined value.

The processing unit can be configured to determine information about the concentricity properties of a rotating device (spindle) of the machine tool based on the identified concentricity error and/or axial run-out error of the rotary-driven tool and to provide this information for forwarding to the numerical controller of the machine tool.

The processing unit can be configured to analyze a spindle state of the machine tool. For this spindle state analysis, the shading progression is measured using a (high-precision concentrically ground) reference tool at speeds defined beforehand. The signal processing differs in this case fundamentally from that of the tool measurement. Even higher-frequency components are included in the analysis. Individual events, caused for example by a drop of coolant, are eliminated by the described filters. The analysis of the determined signal path comprises the determination of the concentricity error, splitting into several frequency bands, analysis of crest factors, single pulses and/or root mean square, RMS, power values. The key figures supplied by the evaluation algorithm are compared with the data of the initial state of the machine tool, in particular the spindle, taking empirical values into account. If a predetermined threshold is exceeded, a warning message is sent to the machine controller. The aim is the predictive detection of bearing wear and/or damage to the spindle of the machine tool, in order to be able to plan for optimal maintenance on objective statements. Machine availability is thus improved and lasting quality ensured. Machine failure and the associated risks are avoided.

The processing unit can be configured to apply an autocorrelation function to the received signals to determine the useful signal components and/or interference signal components.

The processing unit can further be configured to determine the interference signal component and/or the useful signal component based on an interruption rate, an interruption depth, a speed, a number of cutting edges, an ambient air humidity, a period duration of a revolution, a periodicity of the signal received, a position and/or a tool type of the rotary-driven tool and/or of the at least one cutting edge and to provide information about the interference signal component and/or the useful signal component for forwarding to the numerical controller of the machine tool.

As another solution a processing unit is proposed. The processing unit for measuring and controlling a rotary-driven tool is connectable to a light barrier arrangement, which comprises a light-transmitting unit and a light-receiving unit. The processing unit is configured to receive from the light-receiving unit at least approximately proportional analog signals to the shading generated by the rotary-driven tool and/or at least one cutting edge of the rotary-driven tool at a first measuring position. The light barrier arrangement comprises a first digital interface, which is configured to transmit status information (e.g. Error, Ready, Battery flat, START, END) of the light barrier arrangement to the processing unit and to receive control signals from the processing unit. The light barrier arrangement further comprises a low-pass filter unit, which is configured to filter frequency components of the analog signals that are higher than a predetermined limit frequency, and a conversion unit, which is configured to convert the filtered analog signals into filtered digital signals, and a second digital interface, which is configured to transmit the filtered digital signals to a processing unit. The processing unit is configured to receive and evaluate the filtered digital signals, to receive status information of the light barrier arrangement, and to transmit control signals to the light barrier arrangement, wherein the evaluation of the signals received by the processing unit comprises the following steps: determination of an interference signal component and/or a useful signal component of the received signal; and provision of information about the useful signal component, the interference signal component and/or the received signal for forwarding to a numerical controller of a machine tool.

A sampling rate of the second digital interface for sampling the filtered analog and digitally converted signal can be set to an interruption rate, an interruption depth, a speed and/or a number of cutting edges of the rotary-driven tool and/or of the at least one cutting edge.

A processing unit is proposed as a further solution. The processing unit for measuring and controlling a rotary-driven tool is connectable to a light barrier arrangement, which comprises a light-transmitting unit and a light-receiving unit. The processing unit is configured to receive from the light-receiving unit analog signals that are at least approximately proportional to shading generated by the rotary-driven tool and/or at least one cutting edge of the rotary-driven tool at a first measuring position. The light barrier arrangement comprises a digital interface, which is configured to transmit status information of the light barrier arrangement to the processing unit and to receive control signals from the processing unit, and an analog interface, which is connected parallel to the digital interface, which is configured to transmit the analog signals to a low-pass filter unit of the processing unit and receive control signals from the same. The low-pass filter unit is configured to filter frequency components of the analog signals, which components are higher than a predetermined limit frequency, and to transmit the filtered analog signals to a conversion unit of the processing unit. The conversion unit is configured to convert the filtered analog signals into filtered digital signals, transmit the digital signals to the processing unit and receive control signals from the processing unit. The processing unit is configured to evaluate the digital signals and to transmit control signals, wherein the evaluation of the digital signals received by the processing unit comprises the following steps: determination of an interference signal component and/or a useful signal component of the digital signal; and provision of information about the useful signal components, the interference signal components and/or the received signal for forwarding to a numerical controller of a machine tool.

A sampling rate of the digital interface and/or of the conversion unit for sampling the analog signal can be set to an interruption rate, an interruption depth, an interruption direction, a speed and/or a number of cutting edges of the rotary-driven tool and/or of the at least one cutting edge.

A processing unit is proposed as another solution. The processing unit for measuring and controlling a rotary-driven tool is integrated into a light barrier arrangement, which comprises a light-transmitting unit and a light-receiving unit. The processing unit is configured to receive from the light-receiving unit analog signals that are at least approximately proportional to shading generated by the rotary-driven tool and/or at least one cutting edge of the rotary-driven tool at a first measuring position. The light barrier arrangement further comprises a communications unit, a low-pass filter unit and a conversion unit. The communications unit is configured to transmit status information of the light barrier arrangement to the processing unit and to receive control signals from the processing unit. The low-pass filter unit is configured to filter frequency components of the analog signals, which components are higher than a predetermined limit frequency, and to transmit the filtered analog signals to the conversion unit of the processing unit. The conversion unit is configured to convert the filtered analog signals into proportional filtered digital signals, transmit the filtered digital signals to the processing unit and receive control signals from the processing unit. The processing unit is configured to evaluate the filtered digital signals and to transmit control signals, wherein the evaluation of the digital signals received by the processing unit comprises the following steps: determination of an interference signal component and/or a useful signal component of the digital signal; and provision of information about the useful signal components, the interference signal components and/or the received signal for forwarding to a numerical controller of a machine tool.

The low-pass filter unit according to one of the previous exemplary embodiments can be a Butterworth filter unit, a Sallen-Key filter unit or a low-pass filter unit of the nth order, wherein n is a natural number.

The interfaces of the previous exemplary embodiments can be formed to transmit signals wirelessly or wired.

A processing unit according to one of the previous exemplary embodiments can further comprise a value storage unit, wherein the value storage unit is configured to store the useful signal component, the interference signal component, the received signal, the frequency and/or amplitude of the signal, tool-related information such as the interruption rate, the interruption direction, the number of cutting edges, the interruption depth of individual cutting edges, the shading time of individual cutting edges, the speed, the form and/or the length of the rotary-driven tool, furthermore a task-specific evaluation instruction, a result status (e.g. result is/not/present, result is valid) and the predefined calibration function.

Furthermore, a machine tool is proposed, comprising a processing unit for measuring and controlling a rotary-driven tool according to one of the previous exemplary embodiments.

As a further solution, a method is proposed for measuring and controlling a rotary-driven tool. The method comprises the steps: registering shading generated by the rotary-driven tool and/or at least one cutting edge of the rotary-driven tool at a first measuring position; generating signals that are at least approximately proportional to the shading generated; determining an interference signal component and/or a useful signal component from the received signal; and providing information about the useful signal component, the interference signal component and/or the signals for forwarding to a numerical controller of a machine tool.

In the method, a frequency and/or amplitude of the signal can be predefined and the interference signal component and/or the useful signal component can be determined based on the predefined frequency and/or amplitude.

The method can further comprise the following steps: repeated determination of the useful signal component, the interference signal component and/or the signal.

The method can comprise the following steps: comparison of the repeatedly determined useful signal components, the interference signal components and/or the signals; determination of a measuring position error based on the comparison of the repeatedly determined useful signal components, the interference signal components and/or the signals; determination of a second measuring position based on the measuring position error; and generation of an at least approximately proportional signal to the shading generated by the rotary-driven tool and/or the at least one cutting edge of the rotary-driven tool at the second measuring position.

Alternatively the method can comprise the following steps: superposing of the repeatedly determined useful signal components, the interference signal components and/or the signals; application of a task-specific block filter to the superposed useful signal components, the interference signal components and/or the signals; determination of a representative value of the superposed useful signal components, the interference signal components and/or the signals to which the task-specific block filter was applied; and provision of information about the representative value of the superposed useful signal components, the interference signal components and/or the signals to the numerical controller of the machine tool.

The method can further comprise the following steps: determination of a form and/or length and/or number of cutting edges of the rotary-driven tool and/or of the at least one cutting edge based on the useful signal component, the interference signal component and/or the signal; and provision of information about the form and/or the length and/or number of cutting edges of the rotary-driven tool and/or of the at least one cutting edge to the numerical controller of the machine tool.

In this case the step of determining the form and/or length and/or number of cutting edges of the rotary-driven tool and/or of the at least one cutting edge can further comprise: use of a predefined calibration function, which indicates a connection between shading generated by the rotary-driven tool and/or the at least one cutting edge and an associated, at least approximately proportional signal.

The method can further comprise the step: identification of the rotary-driven tool by comparing the determined form and/or length and/or number of cutting edges of the rotary-driven tool with a predefined form and/or length and/or number of cutting edges of known tools.

The method can further comprise the following steps: determination of a local maximum of the shading, in order to determine a length of the rotary-driven tool and/or of the at least one cutting edge; and provision of information about the maximum of the shading to the numerical controller of the machine tool.

The step of determining the local maximum of the shading can further comprise the following steps: determination of a symmetrical or approximately symmetrical signal area of the signal; fitting with a sinusoidal regression, a polynomial regression, a Gaussian regression and/or an exponential smoothing of the symmetrical or approximately symmetrical signal area; and determination of the local maximum in the symmetrically or approximately symmetrically fitted signal area.

Alternatively the local maximum can be determined by peak value detection.

The method can further comprise the following steps: determination of a contamination and/or imperfection of the rotary-driven tool and/or of the at least one cutting edge based on the useful signal component and/or the interference signal component; with the following steps, if a contamination is determined: provision of information about a cleaning signal of the rotary-driven tool and/or of the at least one cutting edge; and with the following step if an imperfection is determined: provision of information about a warning signal.

If the rotary-driven tool has a plurality of cutting edges, the method can further comprise the following steps: registration of shadings in the light beam generated by the plurality of cutting edges of the rotary-driven tool; generation of signals proportional to the shadings generated; and determination of interference signal components and/or useful signal components of the proportional signals.

If the rotary-driven tool has the plurality of cutting edges, the method can comprise the following steps: determination of a shortest and a longest cutting edge of the rotary-driven tool based on the useful signal components of the proportional signals; and determination of a concentricity error based on the determined shortest and longest cutting edges of the rotary-driven tool, if useful signal components and/or interference signal components of repeatedly received signals deviate from one another by a predetermined value.

In the method the useful signal component, the interference signal component and/or the signal can be determined by applying autocorrelation.

Furthermore, in the method the useful signal component and/or the interference signal component can be determined based on an interruption rate, an interruption direction, an interruption depth, a shading threshold, a shading time per cutting edge, a speed, a number of cutting edges, an ambient air humidity, a period duration of a revolution, a periodicity of the received signal, a position and/or a tool type of the rotary-driven tool and/or of the at least one cutting edge and the information about the useful signal component and/or the interference signal component can be provided as information to the numerical controller of the machine tool.

BRIEF DESCRIPTION OF THE DRAWING

Further details, features, advantages and effects of the method and devices described here result from the following description of currently preferred variants and from the drawings. These show:

FIG. 10 a schematic representation of a processing unit for measuring and controlling a rotary-driven tool according to a third embodiment.

FIG. 11 a schematic representation of a processing unit for measuring and controlling a rotary-driven tool according to a fourth embodiment.

DETAILED DESCRIPTION OF THE DRAWINGS

Figure 1:
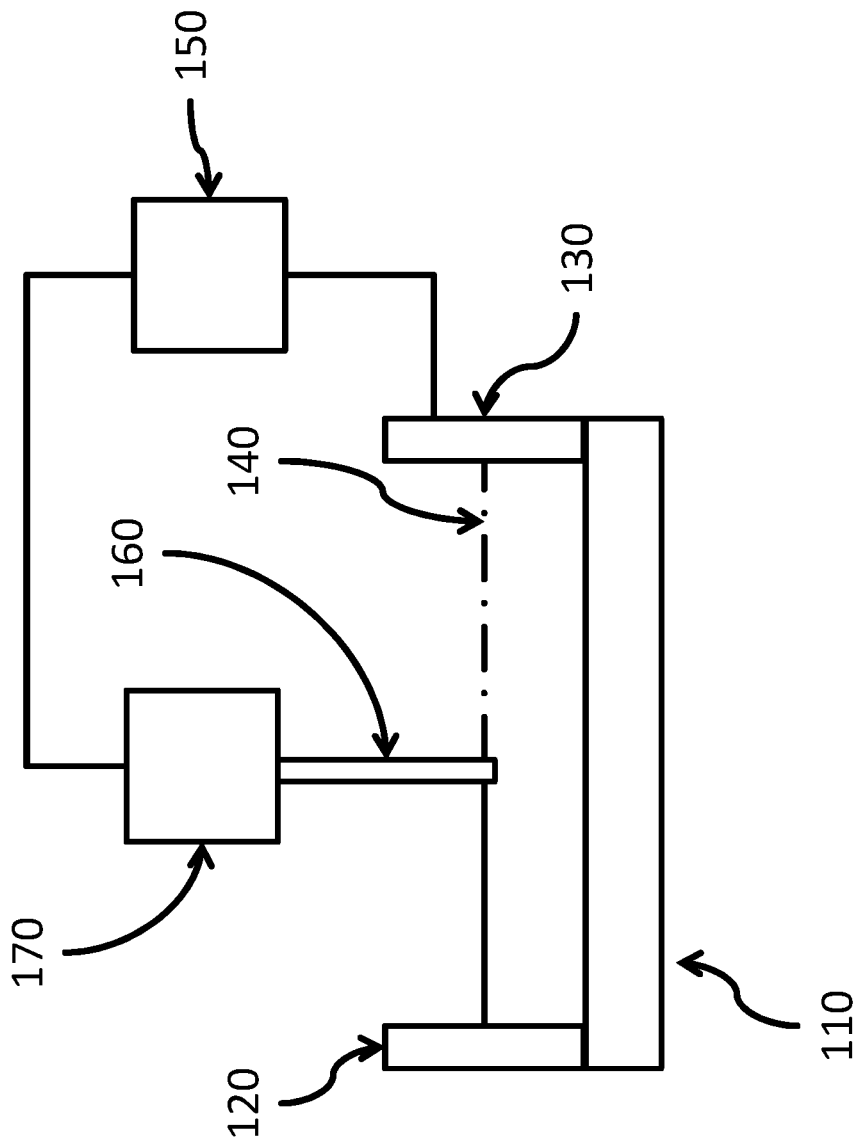
FIG. 1 a schematic representation of a processing unit for measuring and controlling a rotary-driven tool according to a first embodiment.

In FIG. 1 a processing unit 150 for measuring and controlling a rotary-driven tool 160 according to a first embodiment is illustrated schematically. The rotary-driven tool 160 is clamped in a machine tool 170 and can be moved by this to a first measuring position. The rotary-driven tool 160 is preferably positioned here in such a way that at least a part of the tool 160 or at least a cutting edge 180 of the tool protrudes at least partially into a light beam 140 of a light barrier arrangement 110. Since the tool 160 and/or the at least one cutting edge 180 protrudes at least partially into the light beam 140, the tool 160 and/or the at least one cutting edge 180 shades a part of the light beam 140, which is indicated accordingly by a dotted and dashed line.

The light barrier arrangement 110 comprises a light-transmitting unit 120 and a light-receiving unit 130. The light-transmitting unit 120 is configured to transmit the light beam 140 and the light-receiving unit 130 is configured to receive the light beam 140. The light transmitted by the light-transmitting unit 120 is laser light here. Furthermore, the light-receiving unit 130 is connected to the processing unit 150, so that the processing unit 150 receives at least approximately proportional signals to shading generated by the rotary-driven tool 160 and/or a cutting edge 180 of the rotary-driven tool 160 at the first measuring position.

The processing unit 150 evaluates the received signals in that the processing unit 150 determines an interference signal component and/or a useful signal component of the received signals. The processing unit 150 can further be connected to a numerical controller of the machine tool 170 that is not illustrated further here, and can provide information about the interference signal component, the useful signal component and/or the received signals.

Communication between the light-receiving unit 130 and the processing unit 150, as well as communication between the processing unit and the numerical controller of the machine tool 170, takes place here in a wired manner, but can also take place wirelessly. Furthermore, the processing unit can receive signals from the numerical controller of the machine tool 170 and process these. The processing unit 150 is further configured here to transmit control signals to the light-receiving unit 130 and/or the light-transmitting unit 120, in order to control these. Alternatively or in addition, the light-receiving unit 130 and/or the light-transmitting unit 120 can be connected to the numerical controller of the machine tool and be controlled by this.

To illustrate better the determination of the interference signal component and/or useful signal component of the received signals, schematic signal path diagrams are illustrated in FIGS. 2 to 4, 6 and 7.

Figure 2:
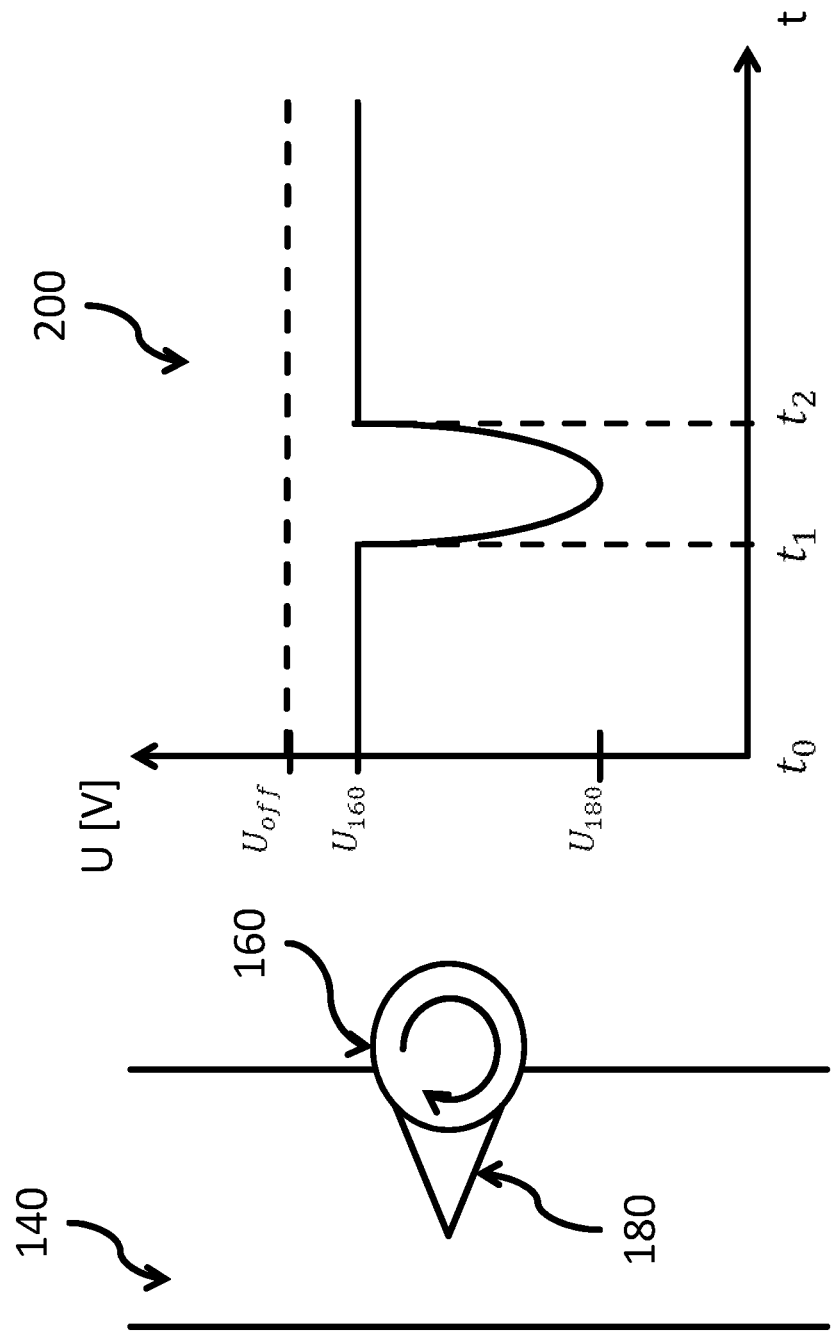
FIGS. 2 to 4 a schematic representation of signal path diagrams in operation of a variant of the first processing unit.

In FIG. 2 an enlarged light beam 140 is shown for improved visualization. The rotary-driven tool 160 with the at least one cutting edge 180 is arranged partially in the light beam 140 and is rotated about an axis of rotation running perpendicular to the light beam 140 by the machine tool 170. The arrow shown inside the tool 160 is intended here to indicate the direction of rotation, which is clockwise in the present case.

A signal path diagram 200 is also shown in FIG. 2, in which the x-axis shows a time and the y-axis a voltage. The voltage signal is generated in this case by the light-receiving unit 130 and is the signal proportional to the shading. If light-absorbing or light-scattering particles (for example, coolant drops, swarf or chip fragments), the rotary-driven tool 160 or the at least one cutting edge 180 are not located in the light beam 140, the light-receiving unit 130 generates a voltage signal $U_{off}$ proportional to the light beam 140, which reproduces 0% shading in the present case.

If the tool 160 is located at the position shown in FIG. 2, so that this protrudes at least partially into the light beam 140 without the at least one cutting edge 180 protruding into the light beam 140, the light-receiving unit 130 generates a voltage signal $U_{160}$ ($t_0$). Corresponding to the shading generated by the tool 160, the voltage signal $U_{160}$ is lower than the voltage signal $U_{off}$. A ratio of the shading generated by the tool 160 to the cross section of the light beam 160 corresponds at least approximately to a ratio of the voltage signal $U_{off}$ to the voltage signal $U_{160}$. The signal path diagrams shown in FIG. 2 and the subsequent figures are used for clarification purposes and may therefore deviate from genuine recorded signal path diagrams.

Due to the rotation of the tool 160, the at least one cutting edge 180 interrupts the light beam 140 at time $t_1$ and generates shading increasing initially up to a crest, at which a voltage signal $U_{180}$ is generated by the light-receiving unit 130. Due to the continuously progressing rotation of the tool 160, the shading of the at least one cutting edge 180 decreases after that, until the at least one cutting edge 180 no longer generates any shading in the light beam 140 from time $t_2$ and only the voltage signal $U_{160}$ from the tool 160 is still generated by the light-receiving unit 130. The signal path diagram 200 reproduces a voltage-time curve for a complete revolution of the tool 160 about the axis of rotation.

Since no interference factors of any kind, such as the light-absorbing or light-scattering particles, are located in the light beam 140, the signals generated by the light-receiving unit 130 correspond exclusively to the shadings of the tool 160 and/or of the at least one cutting edge 180. Based on a connection, for example a difference between the voltage signal $U_{160}$ of the tool 160 and the voltage signal $U_{180}$ of the at least one cutting edge 180, the processing unit 150 determines a length of the at least one cutting edge. Since the speed of rotation like the connection between a shading and an associated length of the tool 160 generating the shading and/or of the at least one cutting edge 180 are known to the processing unit 150, the processing unit 150 can additionally or alternatively determine a form of the at least one cutting edge 180.

In measurements hitherto for controlling a rotary-driven tool, the measurement was carried out during the axial movement. This means that the tool was moved into the light beam of the light barrier arrangement while the rotary-driven tool is rotating. The measuring position was read out for a switching signal, wherein the switching signal corresponds to a predetermined partial shading or complete shading of the light beam of the light barrier arrangement. The measuring position at the switching signal was then calculated using a calibration value, a so-called flying measurement was carried out. The length of the tool was determined by subtracting the known light beam position at the defined degree of shading (calibration value) from the measuring position at the switching time.

In contrast to this procedure, the present application discloses that a measurement is carried out with a static axis. To this end the tool 160 is first set to a certain position relative to the light beam 140 of the light barrier arrangement 110. At the set position the tool 160 is already partially located in the light beam 140 of the light barrier arrangement 110 in FIG. 2. Alternatively the tool 160 can also be arranged outside the light beam 140. The current measuring position and the interruption depth of the tool 160 are accordingly added. The known light beam position at a defined degree of shading (calibration value) is subtracted from this sum in order to determine the length of the tool and/or of the at least one cutting edge of the tool.

The processing unit 150 is further configured to forward information about the received signal, the length or the form of the at least one cutting edge 180 to the numerical controller of the machine tool 170.

With reference to the procedure shown in FIG. 2, a length and/or form of the at least one cutting edge 180 is determined. A length and/or form of the tool 160 can likewise be determined if the tool 160 is moved into the light beam 140 in a first direction running perpendicular to the light beam 140 until the tool 160 is located completely in the light beam 140 or causes complete shading of the light beam 140. The tool 160 is then moved in a second direction running opposite to the first direction out of the light beam 140. Based on the signals generated by the light-receiving unit 130, the processing unit 150 determines the length and/or form of the tool 160. The length of the tool 160 is to be understood in FIG. 2 as a diameter of the tool 160 running orthogonally to the light beam 140.

Alternatively or in addition a length and/or form of the tool 160 and/or of the at least one cutting edge is predefined. The processing unit 150 is configured to determine with reference to a comparison of the length and/or form determined based on the signal $U_{180}$ with a length and/or form determined from a previous measurement and/or the predefined length and/or form whether an imperfection of the tool 160 and/or of the at least one cutting edge 180 is present. The imperfection can be a broken-off or bent cutting edge 180 and/or a bent tool 160. Any divergence of the actual state of the at least one cutting edge 180 and/or of the tool 160 from an original newly manufactured state can be defined as an imperfection and determined by the processing unit 150. Alternatively a threshold value for a degree of divergence can be established. If a divergence is below the threshold value, a still acceptable divergence is assumed, so that demands made on the product to be manufactured can be met. If the divergence exceeds the threshold value, the tool 160 must be repaired or exchanged. The processing unit 150 provides information about the imperfection to the numerical controller of the machine tool 170, which causes the machine tool to be stopped based on the information.

The processing unit 150 is further configured to identify the tool 160 based on the determined length and/or form of the tool 160 and/or of the at least one cutting edge 180 and/or the number of cutting edges in the event of a plurality of cutting edges by comparison with the predefined length and/or form and/or number of cutting edges of a tool.

Figure 3:
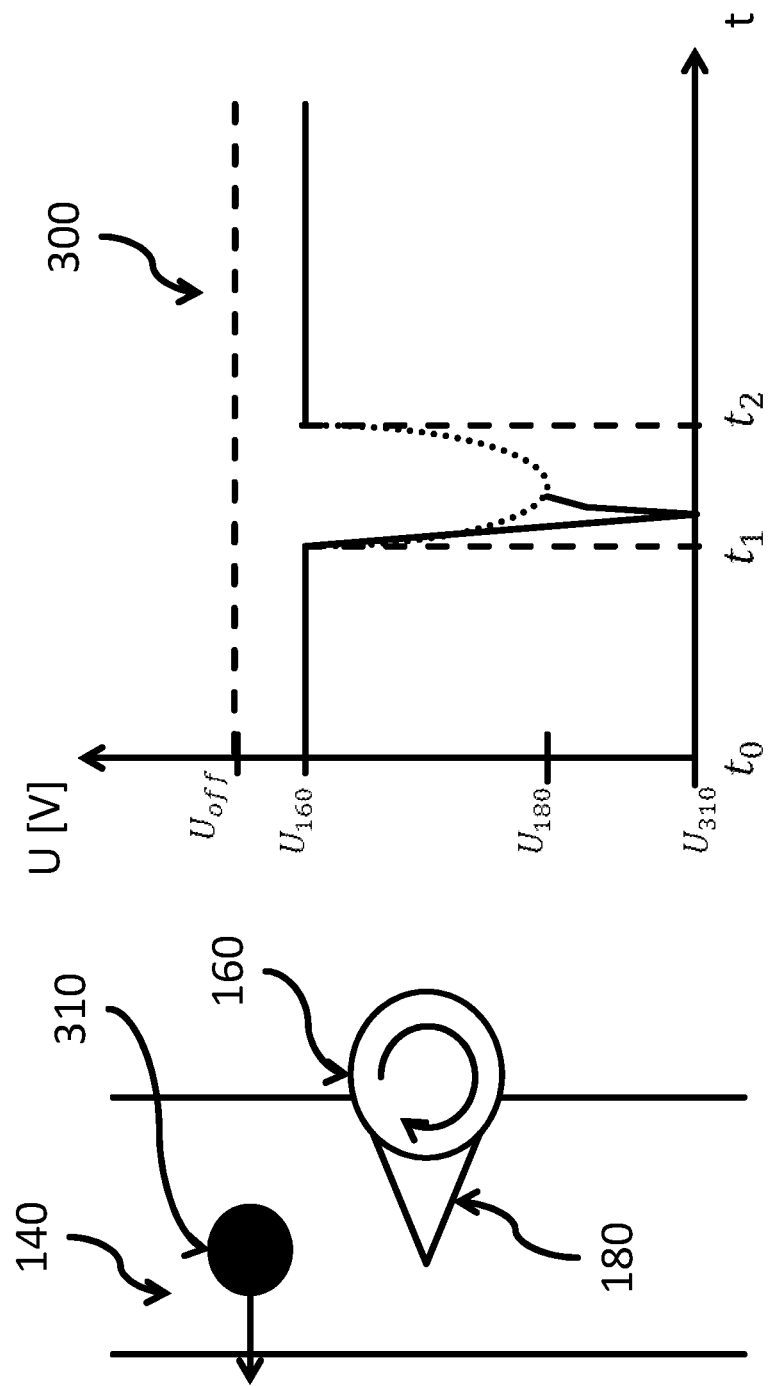

The situation shown in FIG. 3 is similar to the situation shown in FIG. 2, with the difference that a drop of liquid 310 is located in the light beam 140 at the time of measuring of a signal path diagram 300. It is assumed here with regard to the drop of liquid 310 that it is a drop of oil, for example, which is virtually light-impermeable. An arrow emerging from the drop of liquid 310 here represents a movement direction of the drop of liquid 310 in the light beam 140, wherein the movement direction runs perpendicular to the light beam 140 in this case. The drop of liquid 310 is represented in an idealized manner as circular in FIG. 3, wherein its shape can vary as it passes through the light beam 140. The drop of liquid 310 is further located in the time between $t_1$ and $t_2$ in the light beam 140.

As is to be recognized in the signal path diagram 300, the voltage signal $U_{180}$ (see dotted signal path) of the at least one cutting edge 180 is superposed by a voltage signal $U_{310}$ of the drop of liquid 310. If the processing unit 150 were to determine a greatest length and/or form of the at least one cutting edge 180 based on the voltage signal $U_{310}$ without differentiating between a useful signal component and an interference signal component, this would deviate markedly in relation to the greatest length and/or form determined previously based on the voltage signal $U_{180}$ or predefined. A concentricity error, for example, could accordingly be prematurely assumed, which would lead to a stoppage of the machine tool 170 or a replacement of the tool 160.

A velocity at which the drop of liquid 310 moves increases proportionally with a drop distance due to gravitational acceleration. Typical values for the movement velocity of the drop of liquid 310 here are 80 m/min at a drop distance of 0.1 m and 118 m/min at a drop distance of 0.2 m. Based on the voltage signal $U_{180}$ the processing unit 150 further determines a connection between the speed of rotation and the proportionally increasing or decreasing shading. The shading generated by the drop of liquid 310 increases or decreases faster or slower per unit of time than the shading generated by the tool 160 and the at least one cutting edge 180. The processing unit 150 is accordingly configured to determine the useful signal component and the interference signal component of the voltage signal $U_{180}$. With reference to the useful signal component $U_{180}$ the processing unit 150 determines the form and/or length of the at least one cutting edge 180 and/or the number of cutting edges of the rotary-driven tool 160.

Alternatively or in addition the measurement of the signal path is repeated several times. Since the entry of the drop of liquid 310 can be a unique event, the processing unit 150 is configured to compare the plurality of signal path diagrams with one another and not to use the signal path diagram in which the drop of liquid 310 was present in the light beam 140 for measuring and controlling the tool 160 and the at least one cutting edge 180.

The processing unit 150 is further configured to determine a concentricity error of the tool 160 based on the determined useful signal component or components. If the useful signal component or the determined length diverges from one another by a certain limit value in repeated measurements, the processing unit 150 is configured to provide information about a concentricity error to the numerical controller of the machine tool 170.

If the tool 160 has a plurality of cutting edges 180, the processing unit 150 is configured to determine for each of the plurality of cutting edges 180 a length and/or form based on the associated useful signal components. The processing unit 150 is further configured to determine a shortest and a longest cutting edge 180 based on the useful signal components.

As already mentioned, the tool 160 and/or the at least one cutting edge 180 is positioned at the first position for measuring and controlling the tool 160 and/or the at least one cutting edge. Based on the repeatedly performed measurements, the processing unit 150 is configured to determine a measuring position error based on the repeatedly determined useful signal components, interference signal components and/or received signals. If the tool 160 and/or the at least one cutting edge 180 is erroneously positioned in the light beam 140, the measuring position error leads to a defective received signal. For example, in the event of a measuring position error, the otherwise continuous curved progression of the voltage signal can have a double cusp, thus two maxima parallel to the crest of the voltage signal, without contamination having to be present. Such a progression of the voltage signal is detected by the processing unit 150. A position of the light beam 140 and of the tool 160 and/or of the at least one cutting edge 180 are already known to the processing unit 150 or can be determined by this. Based on the ascertained defective voltage signal the processing unit 150 determines a second measuring position, to which the tool 160 and/or the at least one cutting edge 180 is moved. In this case the second measuring position corresponds to a corrected position, at which a double cusp no longer occurs. Alternatively a radial measurement, thus a measurement from the inside (e.g. the center of the light beam 140) to the outside (edge) of the light beam 140 can be carried out, in which a switching point is only generated if instead of the double cusp a clean signal progression (e.g. sinusoidal progression) is detected.

To detect a measuring position error, the signal shape of a tool in the new state (dry, clean) can be recorded and stored additionally or in another alternative. If the signal shape in a later measurement of the tool 160 diverges by a predetermined threshold value from the stored signal shape, a cleaning process is carried out. In the cleaning with air, impurities can remain on the at least one cutting edge 180 of the tool 160 or the tool 160 itself. An extension of the time for cleaning with air is ineffective in these cases. Interference signal components must accordingly be filtered/separated from useful signal components and switching points/measured values derived only from the useful signal.

Another possibility for preventing measuring position errors is to perform measurements not only at one point of the tool 160, but over a short section of the tool 160 (e.g. along a length of the tool 160 running in the boring direction). If the shading of the at least one cutting edge 180 of the tool 160 changes while a recording position is being moved along the at least one cutting edge 180 of the tool 160, then at least one of the three following cases is involved. It is a contamination (e.g. dirt particle), which leads to a stronger shading of the at least one cutting edge 180 of the tool 160 over a short area. It can also be a break, which leads to fainter shading of the at least one cutting edge 180 of the tool 160 over the short area. It can also be a corner radius, in which the correct measuring position is left for the length measurement.

Figure 4:
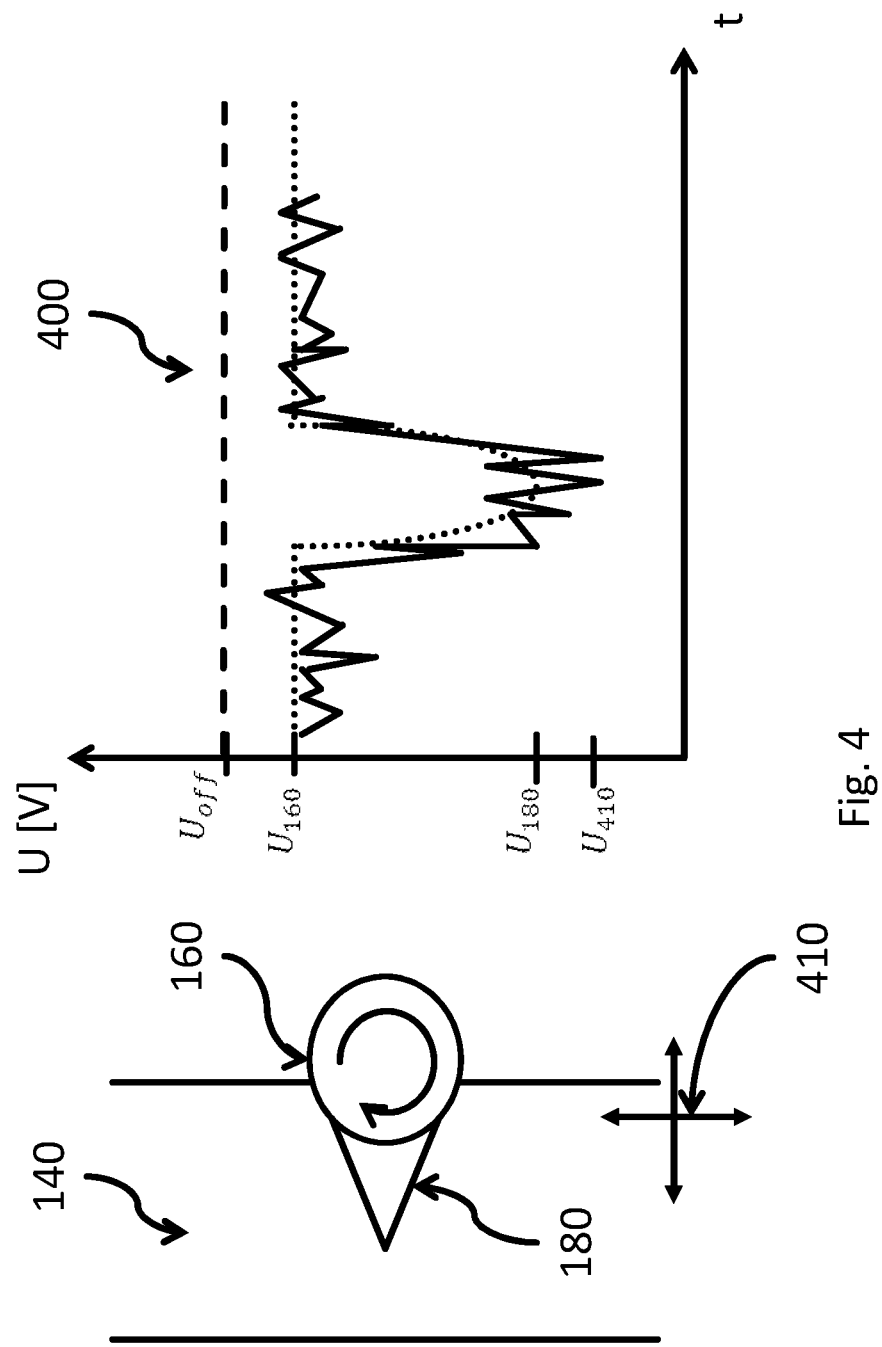

In the measurements of the signal path diagrams, other influences can be a vibration or even shocks of the light barrier arrangement 110 or of the machine tool 170 occurring multiple times. This is illustrated in FIG. 4, wherein the vibration or the shock is possible in several spatial directions, as indicated by way of example by the direction cross 410. The dotted line represents the uninterrupted signal, which is overlaid by interference signal 410.

According to the interruption 410, a signal path diagram 400 is output by the light-receiving unit 130 that has marked variations in the signal progression. These variations correspond to the interference signal component, as a clear length and/or form determination of the tool and/or of the at least one cutting edge 180 is not possible unless the signal is split into the useful signal component and the interference signal component. A frequency and/or an amplitude of the tool 160 and/or of the at least one cutting edge 180 can be predefined. The processing unit 150 is configured to determine the useful signal component and/or the interference signal component from the signal based on the predefined frequency and/or amplitude. In other words, the processing unit 150 separates the signal received from the light-receiving unit 130 into the useful signal component, which corresponds at least approximately to the voltage signal component $U_{160}$, and the interference signal component, which corresponds at least approximately to a voltage signal component $U_{410}$. Based on the useful signal component the processing unit 150 determines the form and/or length of the tool 160 and/or of the at least one cutting edge 180.

The processing unit 150 is configured to determine a contamination and/or an imperfection of the tool 160 and/or of the at least one cutting edge 180 based on the useful signal components and/or interference signal components.

During use of the machine tool 170 and the tool 160 with the at least one cutting edge 180, swarf arises when boring holes in materials to be machined, for example, which swarf can adhere to the machine tool 170, the tool 160 and/or the at least one cutting edge 180. To remove swarf or other residual products, which are desired neither on the machine tool 170, the tool 160, the at least one cutting edge 180 nor on the material to be machined, compressed air or a fluid such as a coolant or a cleaning fluid can be used. Furthermore, coolant can be used even independently of contamination to cool the machine tool 170, the tool 160 and/or the at least one cutting edge.

As shown in FIG. 3, a drop of liquid 310 in the light beam 140 in a measurement of the tool 160 and/or of the at least one cutting edge 180 leads to a voltage signal $U_{310}$, which deviates sharply from the voltage signal $U_{180}$ and thus disrupts the signal received by the light-receiving unit 130. It is a similar situation if swarf, for example, adheres to the tool 160 and/or the at least one cutting edge 180, as this likewise leads to a disruption of the signal received by the light-receiving unit 130.

As already explained, the processing unit 150 is configured to determine the useful signal component and the interference signal component of the received signal. If the processing unit 150 establishes that the useful signal component, for example, of the at least one cutting edge 180 corresponds to a predefined length of the at least one cutting edge 180, it is concluded that the at least one cutting edge 180 is in a perfect state. Conversely it means that the voltage signal $U_{310}$ has arisen due to a contamination such as swarf or the drop of liquid 310. The processing unit 150 is configured to determine a contamination of the tool 160 and/or of the at least one cutting edge 180 based on the interference signal component and to provide a cleaning signal to the numerical controller of the machine tool 170. The numerical controller of the machine tool 170 is configured to initiate cleaning of the tool 160 and/or the at least one cutting edge or the complete arrangement of the machine tool 170 based on the cleaning signal provided by the processing unit 150. The cleaning is carried out by means of compressed air, cleaning fluid (for example, water) and/or coolant, which is provided by another cleaning unit, for example. The numerical controller of the machine tool 170 can transmit via the processing unit 150 or directly to the machine tool 170 and/or the light barrier arrangement 110 a stop signal to interrupt measurement during the cleaning process, and a start signal to restart the machine tool 170 and/or the light barrier arrangement 110.

The processing unit is further configured to determine an imperfection of the tool 160 and/or of the at least one cutting edge 180 based on the useful signal component and the interference signal component. An imperfection can be a broken, shortened and/or bent cutting edge 180 or a deformed tool. A tool 160 and/or at least one cutting edge 180 having an imperfection can lead to defective product results and rejects during further use in the machine tool 170.

For example, if a piece of a tip of the at least one cutting edge 180 breaks off, the useful signal component of the signal received by the light-receiving unit 130 is smaller and thus also the determined length of the at least one cutting edge 180. If the processing unit 150 determines an imperfection of the tool and/or of the at least one cutting edge 180, the processing unit provides a warning signal to the numerical controller of the machine tool 170. Based on the warning signal the numerical controller of the machine tool 170 stops the machine tool 170 and/or the light barrier arrangement 110 or initiates a machining stop of the machine tool 170 and/or of the light barrier arrangement 110, in order to prevent defective product results and rejects.

Figure 5:
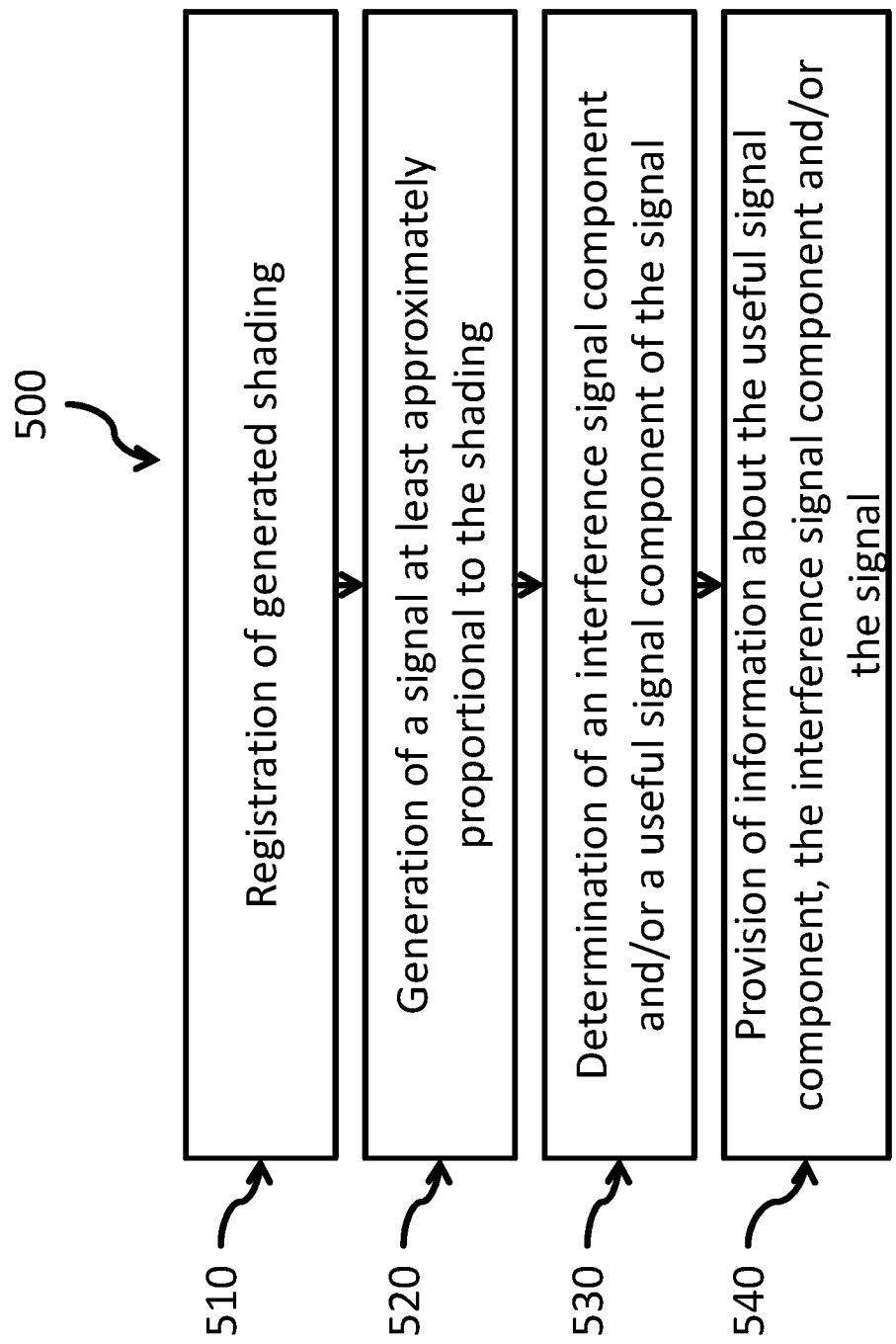
FIG. 5 a block diagram of a method for measuring and controlling a rotary-driven tool.

FIG. 5 illustrates a method 500 for controlling the tool 160 and/or the at least one cutting edge 180. The method is explained below for better visualization of the arrangement shown in FIG. 1 of the light barrier arrangement 110, the machine tool 170 with the tool 160 and the at least one cutting edge 180 and the processing unit 150, but is not limited to this arrangement or association of method steps with certain units.

In a first step 510, shading of the light beam 140 generated by the tool 160 and/or the at least one cutting edge 180 is registered by the light-receiving unit 130 at the first measuring position. In a next step 520 the processing unit 150 receives signals generated by the light-receiving unit 130 that are at least approximately proportional to the shading. Then in step 530 an interference signal component and/or useful signal component of the received signals is determined by the processing unit 150 and in step 540 is provided in the form of information about the useful signal component, the interference signal component and the received signals to the numerical controller of the machine tool 170.

The step 530 of determining the useful signal component and/or the interference signal component can comprise intermediate steps, as already described previously or described below for the processing unit 150.

Figure 6:
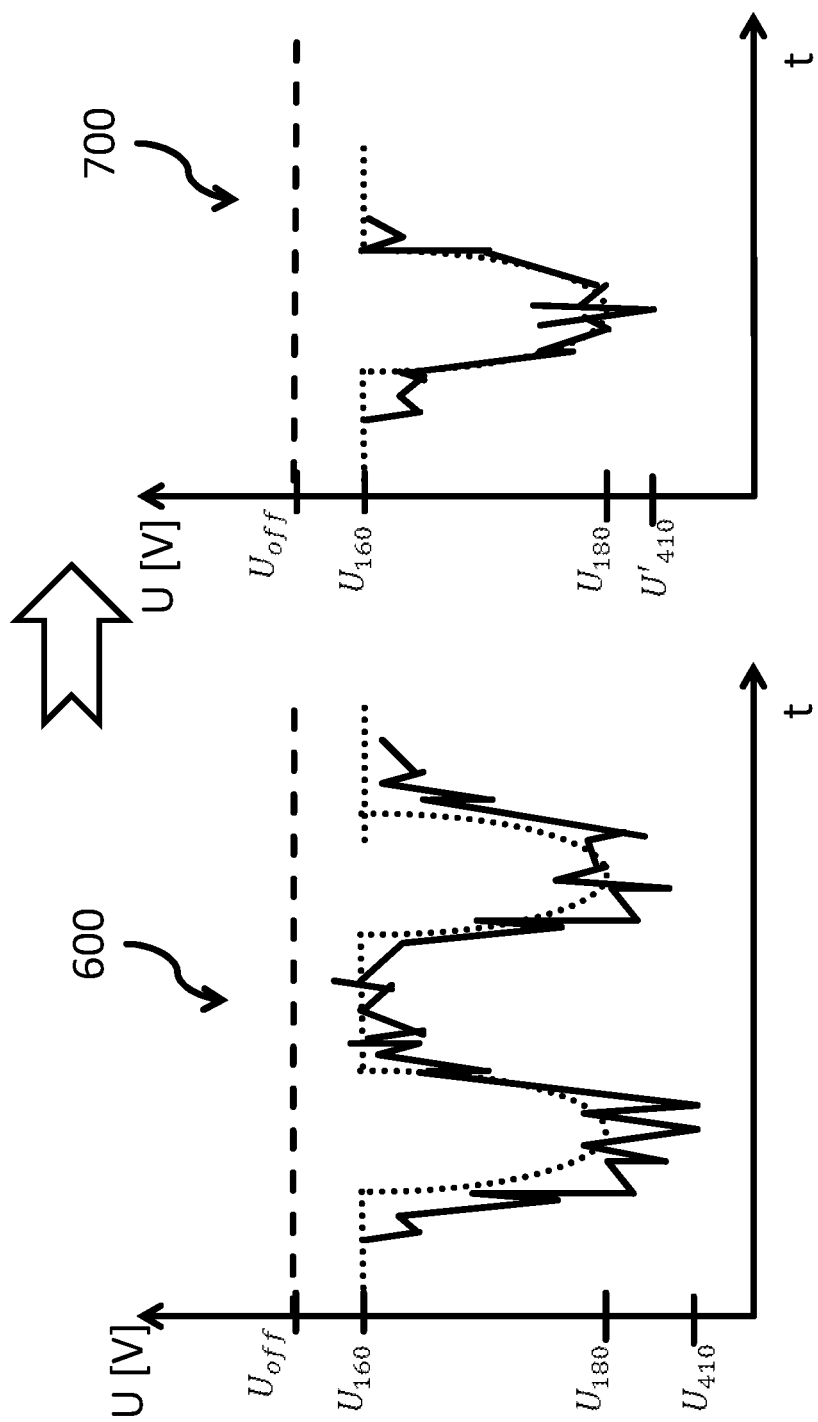
FIG. 6 a schematic representation of a signal path diagram and a superposing of the signals in operation of a variant of the first processing unit.

FIG. 6 shows a signal path diagram 600 of a multiple measurement of the voltage signal $U_{180}$ of the at least one cutting edge 180, wherein the interference 410, such as a vibration or shock, for example, disrupts the measurement and leads to the voltage signal $U_{410}$. To minimize a disruption of the voltage signal, the processing unit 150 is configured to superpose the voltage signals registered multiple times. The processing unit 150 is further configured to apply a suitable block filter to the superposed voltage signals in order to minimize the interference, as shown in signal path diagram 700. Based on the superposed voltage signal, which has been processed using the suitable block filter, the processing unit 150 determines the useful signal component and/or the interference signal component of the superposed voltage signal processed using the suitable block filter.

Alternatively or in addition, the processing unit 150 already determines a useful signal component and/or interference signal component of the voltage signals respectively with reference to the voltage signals of the signal path diagram 600. The useful signal components and/or interference signal components are then superposed by the processing unit 150 and the suitable block filter is applied.

Figure 7:
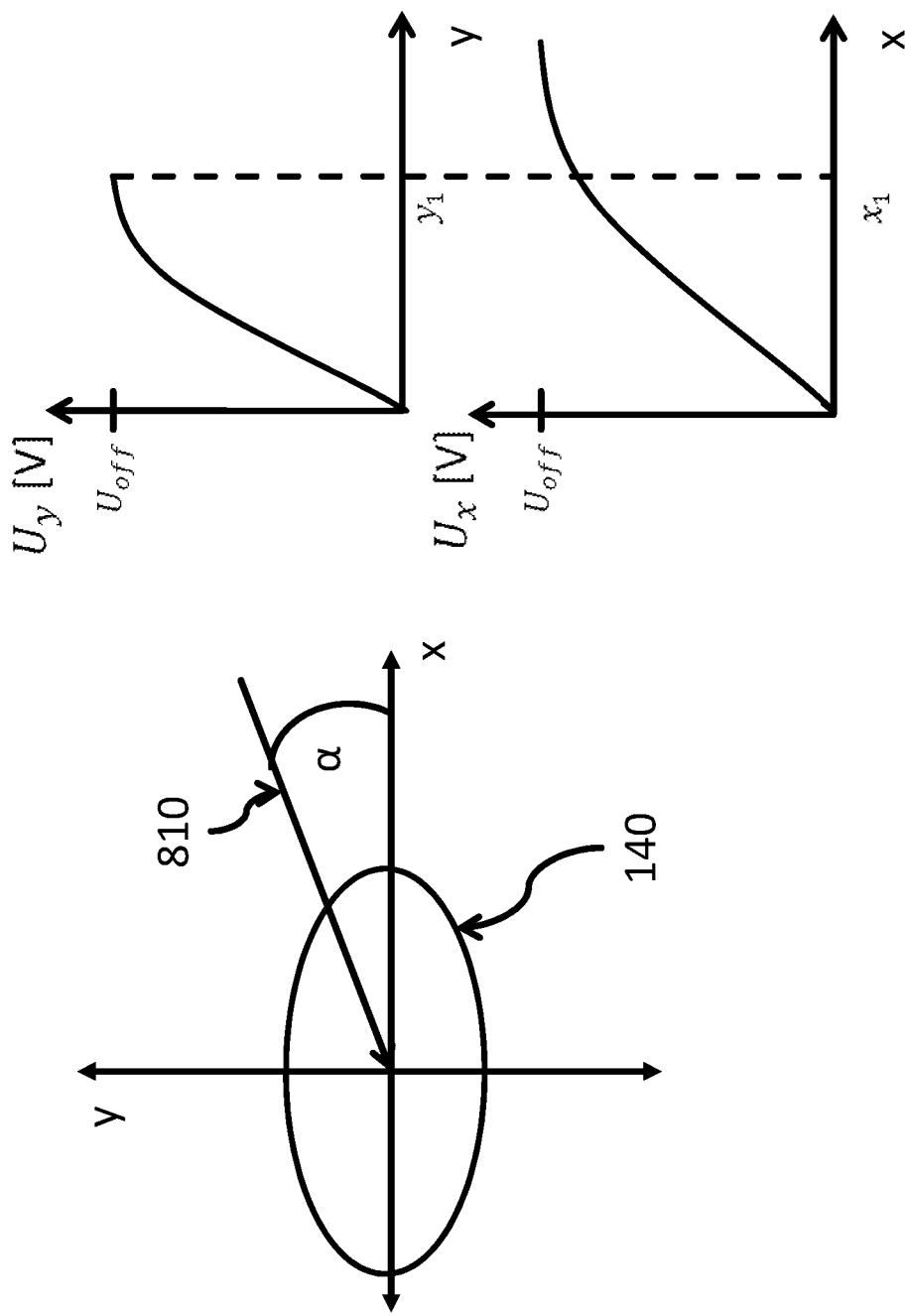
FIG. 7 a schematic representation of a calibration function of a light beam.

The light-receiving unit 130 generates proportional signals to the shading of the tool 160 and/or the at least one cutting edge 180. Here it is initially assumed that the light beam 140 is at least approximately circular, so that it makes no difference with regard to the path section interrupting the light beam and the shading associated with this. In practice, however, an approximately circular light beam 140 cannot always be assumed. In FIG. 7 an elliptical light beam 140 is shown, which is larger in an x-direction than in a y-direction. Furthermore, two signal path diagrams are shown in FIG. 7. On account of the elliptical shape of the light beam 140, the signal curve clearly differs if the tool 160 and/or the at least one cutting edge 180 is moved only on the x-axis or only on the y-axis to a center of the light beam 140.

Since a diameter of the light beam in FIG. 7 is smaller in the y-direction than a diameter in the x-direction, the light beam 140 is shaded more at a distance $y_1$ in the y-direction than at a distance $x_1$ in the x-direction, wherein $x_1=y_1$. In other words, the tool 160 and/or the at least one cutting edge 180 would have to be moved further in the x-direction than in the y-direction to generate shading of the same magnitude and thus an equivalent, at least approximately proportional signal by the light-receiving unit 130.

In order to take a not ideally symmetrical light beam 140 into account during the measurement and control of the tool 160 and/or the at least one cutting edge, the processing unit 150 is configured to use a calibration function when determining the length and/or the form of the tool 160 and/or the at least one cutting edge 180. The calibration function can be determined by the processing unit 150 during an initialization phase or already be predefined.

If the tool 160 is moved from a direction 810 into the light beam 140, a determined length and/or form of the tool and/or of the at least one cutting edge would not agree, for example, with a predefined form and/or length of the tool 160 without the calibration function and the processing unit 150 could erroneously determine an imperfection or a length measuring error. Due to the use of the calibration function by the processing unit 150, which function reproduces a connection between shading generated by the tool 160 and/or the at least one cutting edge and an associated, approximately proportional signal, the erroneous determination of an imperfection or of a length measuring error in the case of a not ideally symmetrical light beam 140 is avoided.

Figure 8:
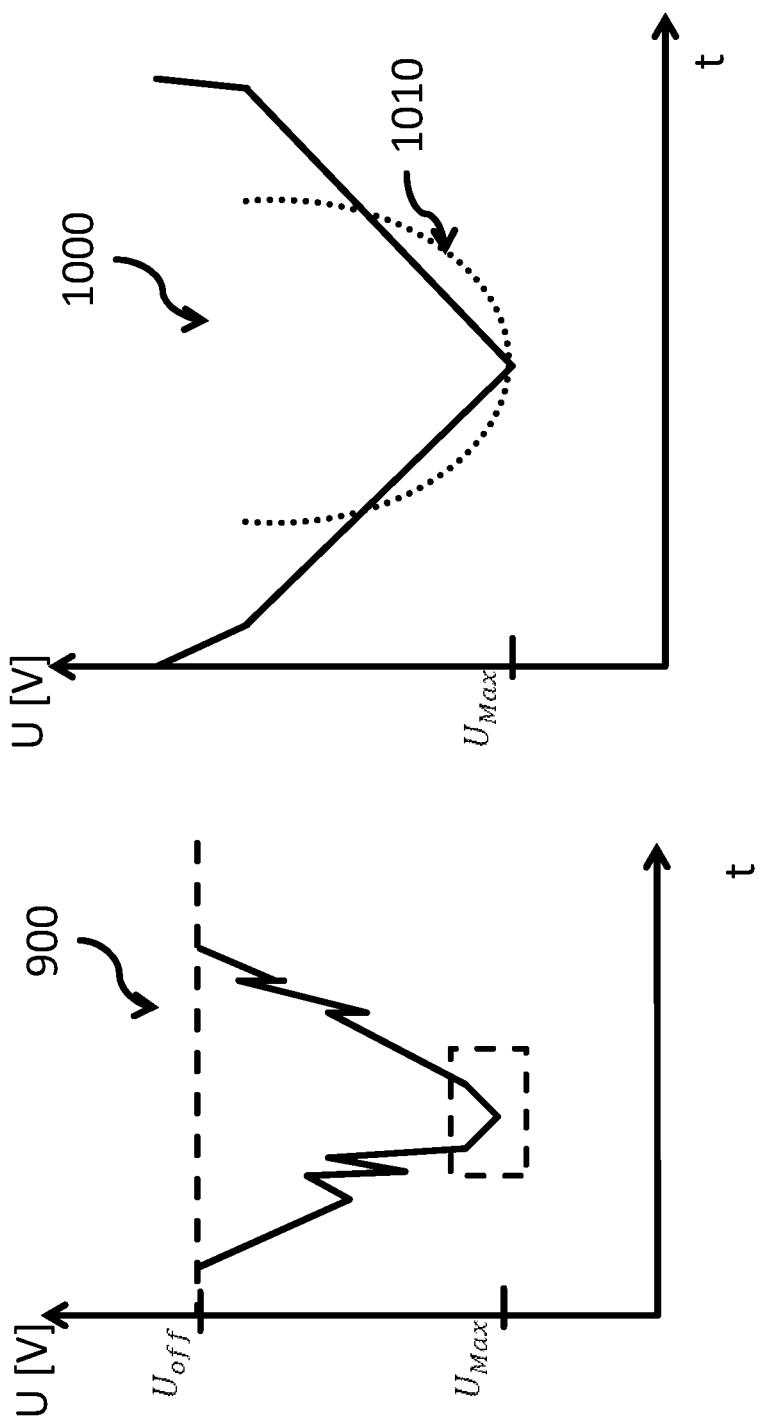
FIG. 8 a schematic representation of a signal path diagram and a fit of the signal path diagram in operation of a variant of the first processing unit.

To determine the length of the tool 160 and/or the at least one cutting edge 180, the processing unit 150 is configured to determine a symmetrical or approximately symmetrical area of the voltage signal received by the light-receiving unit 130, in order to determine a maximum of the voltage signal. As is to be seen in the signal path diagram 900 shown in FIG. 8, the voltage signal is not symmetrical. The processing unit 150 establishes an area of the voltage signal that is approximately symmetrical, such as shown for example by the dashed rectangle in the signal path diagram 900. The signal path diagram 1000 shows an extract from the signal path diagram 900 that corresponds to the area of the dashed rectangle.

As shown in the signal path diagram 1000, this area of the voltage signal is symmetrical or approximately symmetrical and the processing unit 150 determines the maximum within this area. Based on the maximum determined, the processing unit 150 then determines the length of the tool 160 and/or of the at least one cutting edge 180.

Alternatively the processing unit 150 fits the symmetrical or approximately symmetrical area of the voltage signal with a fit 1010, in order to determine the maximum. The fit 1010 is a sinusoidal regression, a polynomial regression, a Gaussian regression and/or an exponential smoothing.

Figure 9:
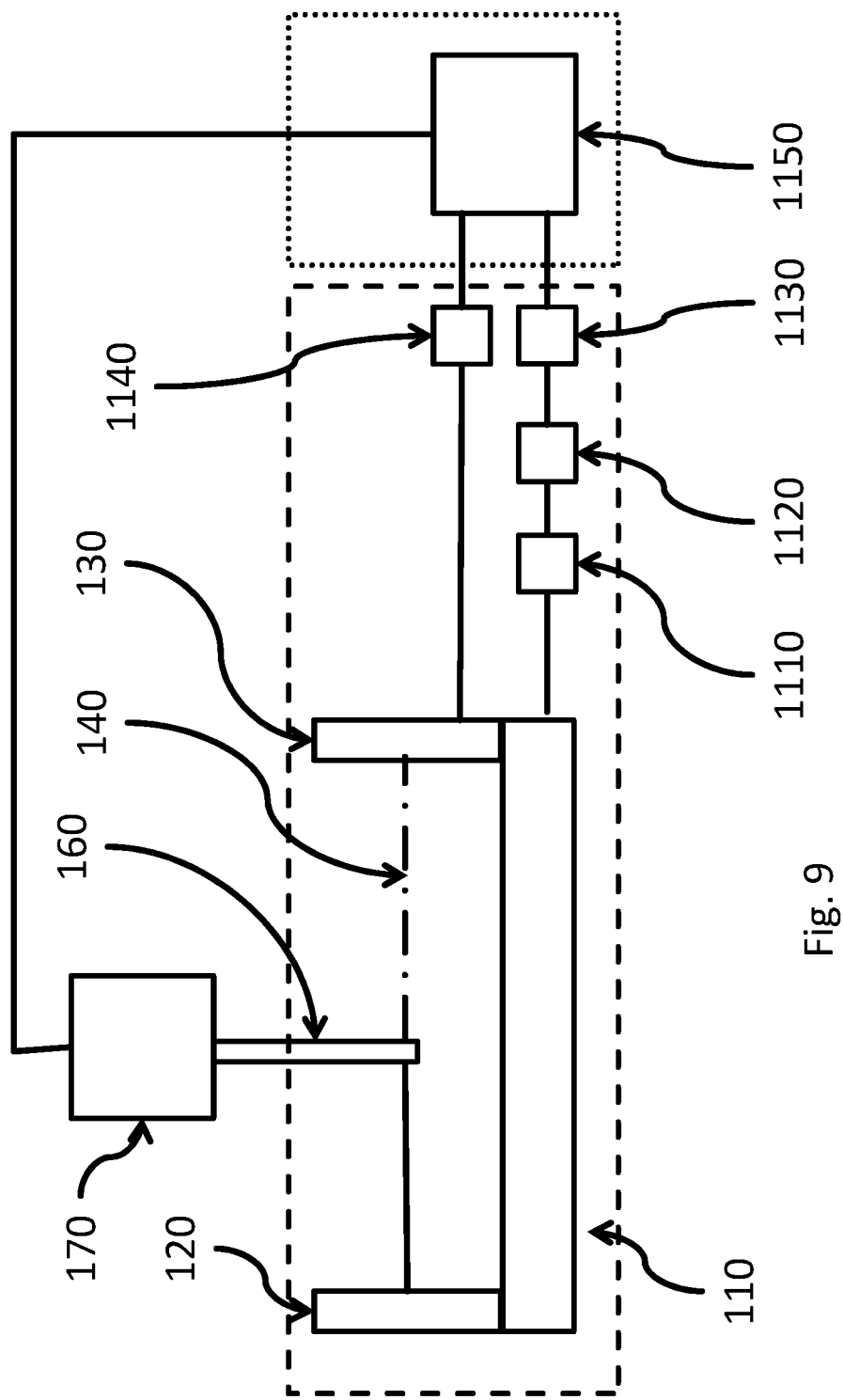
FIG. 9 a schematic representation of a processing unit for measuring and controlling a rotary-driven tool according to a second embodiment.

FIG. 9 shows another embodiment with a processing unit 1150, wherein the processing unit 1150 is connected to the light barrier arrangement 110 via a first digital interface 1140, which is configured to transmit status information of the light barrier arrangement to the processing unit and to receive control signals from the processing unit. In parallel to the first digital interface 1140 the processing unit 1150 is connected to the light-receiving unit 130 via a second digital interface 1130, via a conversion unit 1120 and a low-pass filter unit 1110. The first digital interface 1140, the second digital interface 1130, the conversion unit 1120 and the low-pass filter unit 1110 are integrated into the light barrier arrangement 110 as illustrated by the dashed line, wherein the first digital interface 1140 and/or the second digital interface 1130 is connected by cable to the processing unit 1150, but can also be connected wirelessly to this. Frequencies of the analog signal transmitted by the light-receiving unit 130, which frequencies are higher than a certain limit frequency, can be filtered by means of the low-pass filter unit 1110 and an analog signal cleaned of high-frequency interference signals can be forwarded to a conversion unit 1120, which is configured to convert the filtered analog signals into proportional filtered digital signals. The filtered digital signals are conducted by the conversion unit 1120 to the second digital interface 1130. The digital interface 1130 is connected by cable to the processing unit 1150, but can also be connected wirelessly to this. The processing unit 1150 is configured, as already described, to determine a useful signal component and an interference signal component of the digital signal and to provide information about the useful signal component, the interference signal component and/or the digital signal to the numerical controller of the machine tool 170.

A sampling rate of the second digital interface 1130 for sampling the filtered analog signal is set to an interruption rate in the light beam 140, an interruption depth, an interruption direction, a speed and/or a number of cutting edges of the tool 160 and/or of the at least one cutting edge.

FIG. 10 shows another embodiment with a processing unit 1250, wherein the processing unit 1250 is connected to the light barrier arrangement 110 via a digital interface 1240 and an analog interface 1230. The digital interface 1240 is configured to transmit status information of the light barrier arrangement 110 to the processing unit 1250 and to receive control signals from the processing unit 1250. In this embodiment an analog signal generated by the light-receiving unit 130 that is at least approximately proportional to the shading is forwarded to an analog interface 1230. The analog interface 1230 transmits the analog signal as an analog differential signal on to a low-pass filter unit 1210, which is configured to filter frequency components of the analog signal that are higher than a predetermined limit frequency. The filtered analog signal is transmitted on by the low-pass filter unit 1210 to a conversion unit 1220, which in turn converts the filtered analog signal into a filtered digital signal. The conversion unit 1220 transmits the filtered digital signal to the processing unit 1250. In the embodiment shown in FIG. 10, the digital interface 1240 and the analog interface 1230 are integrated into the light barrier arrangement 110, as shown by the dashed line. The low-pass filter unit 1210 and the conversion unit 1220 are integrated into the processing unit 1250, as illustrated by the dotted line.

FIG. 11 shows another embodiment with a processing unit 1350, wherein the processing unit 1350 is integrated into the light barrier arrangement 110. The processing unit 1350 is connected via a digital interface 1340, which is configured to transmit status information of the light barrier arrangement 110 to the processing unit 1350 and to receive control signals from the processing unit 1350, to the light barrier arrangement 110. In this embodiment an analog signal generated by the light-receiving unit 130, which signal is at least approximately proportional to the shading, is forwarded directly to a low-pass filter unit 1310, which is configured to filter frequency components of the analog signal that are higher than a predetermined limit frequency. The filtered analog signal is transmitted by the low-pass filter unit 1310 on to a conversion unit 1320, which in turn converts the filtered analog signal into a filtered digital signal. The conversion unit 1320 transmits the filtered digital signal to the processing unit 1350. In the embodiment shown in FIG. 11, the processing unit 1350, the digital interface 1340, the low-pass filter unit 1310 and the conversion unit 1320 are integrated into the light barrier arrangement 110, as shown by the dashed line.

The processing units 1150, 1250, 1350 can have the same features as the processing unit 150. Only additional supplementary features were described for the processing units 1150, 1250 1350.

A processing unit 150, 1150, 1250, 1350 of the previous embodiments described can additionally be connected to a value storage unit. The value storage unit is configured to store and reproduce a useful signal component and/or an interference signal component of a signal received by the light-receiving unit 130. In addition, the value storage unit can be configured to store a length and/or form of the tool 160 and/or of the at least one cutting edge 180 determined by the processing unit 150, 1150, 1250, 1350, the interruption depth of individual cutting edges, the shading time of individual cutting edges and the calibration function, as well as the fitted signal path diagrams. In addition, the value storage unit can be configured to store the tool-related information received by the numerical controller of the machine tool 170, such as the interruption rate, the interruption direction, the number of cutting edges, the speed, the form and/or the length of the rotary-driven tool, as well as a task-specific evaluation instruction.

A sampling rate of the digital interface 1130 and/or of the conversion unit 1220, 1320 for sampling the analog signal/filtered analog differential signal is set to an interruption rate in the light beam 140, an interruption depth, an interruption direction, a speed and/or a number of cutting edges of the tool 160 and/or of the at least one cutting edge 180.

The previously described variants of the method or of the devices and their functional and operating aspects serve only for a better understanding of the structure, mode of functioning and properties; they do not restrict the disclosure to the exemplary embodiments, for instance. The figs are partially schematic, wherein substantial properties and effects are shown in some cases considerably enlarged, in order to clarify the functions, operating principles, technical configurations and features. Here each mode of functioning, each principle, each technical configuration and each feature, which is/are disclosed in the figures or in the text, can be combined freely and in any manner with all claims, each feature in the text and in the other figures, other modes of functioning, principles, technical configurations and features that are contained in this disclosure or result therefrom, so that all conceivable combinations are to be associated with the described method and devices. Here combinations are also comprised between all individual embodiments in the text, meaning in each section of the description, in the claims and even combinations between different variants in the text, in the claims and in the figures. For the value ranges cited here, it is the case that all numerical intermediate values are disclosed.

Even the claims do not limit the disclosure and thus the combination options of all features shown with one another. All disclosed features are explicitly disclosed here also individually and in combination with all other features.

The invention claimed is:

1. A processing unit for measuring and controlling a rotary-driven tool, wherein the processing unit is connectable to a light barrier arrangement, which comprises a light-transmitting unit and a light-receiving unit, wherein the processing unit is configured to receive signals that are at least approximately proportional to shading generated by the rotary-driven tool or by at least one cutting edge of the rotary-driven tool at a first measuring position;
   wherein the processing unit is configured to evaluate the received signals and to transmit control signals to the light barrier arrangement, wherein the evaluation of the signals received by the processing unit comprises the following steps:
      determination of an interference signal component or of a useful signal component of the received signal, wherein the processing unit is configured to determine the useful signal component or the interference signal component repeatedly; and
      provision of information about the useful signal component, the interference signal component or the received signal for forwarding to a numerical controller of a machine tool, and
   wherein the processing unit is configured to superpose the repeated useful signal components or the interference signal components, to apply a block filter to the superposed useful signal components or the superposed interference signal components, to determine a representative value of the useful signal components or the interference signal components based on the superposed useful signal components or the superposed interference signal components, and to provide information about the representative value of the useful signal components or the interference signal components for forwarding to the numerical controller of the machine tool.

2. The processing unit according to claim 1, wherein a frequency or amplitude of the signal is predefined, wherein the processing unit is configured to determine the interference signal component or the useful signal component based on the predefined frequency and amplitude.

3. The processing unit according to claim 1, wherein the processing unit is configured to compare the repeatedly determined useful signal components with one another and to determine a measuring position based on the comparison, wherein the processing unit is configured to determine a second measuring position based on the measuring position error, wherein the light-receiving unit generates a signal that is at least approximately proportional to the shading generated by the rotary-driven tool or the at least one cutting edge of the rotary-driven tool at the second measuring position.

4. The processing unit according to claim 1, wherein the block filter is a median value filter, a minimum value filter, a maximum value filter, a mean value filter or a combination of these filters.

5. The processing unit according to claim 1, wherein the processing unit is further configured to determine a number of cutting edges or a form or a length of the rotary-driven tool or of the at least one cutting edge based on the useful signal component, the interference signal component or the received signal and to provide information on the number of cutting edges or the form or length of the rotary-driven tool or of the at least one cutting edge to the numerical controller of the machine tool.

6. The processing unit according to claim 5, wherein for determining the form or the length, the processing unit accesses a predefined calibration function, which specifies a connection between shading generated by the rotary-driven tool or the at least one cutting edge and an associated at least approximately proportional signal.

7. The processing unit according to claim 5, wherein the processing unit carries out, based on the determined number of cutting edges or form or length of the rotary-driven tool, a tool identification by comparison of the determined number of cutting edges or form or length with a predefined number of cutting edges or form or length of known tools.

8. The processing unit according to claim 5, wherein the processing unit is configured to determine a local maximum of the shading of the rotary-driven tool or of the at least one cutting edge, in order to determine the length of the rotary-driven tool or of the at least one cutting edge by using the predefined calibration function and to provide information about the length of the rotary-driven tool or the at least one cutting edge to the numerical controller of the machine tool.

9. The processing unit according to claim 8, wherein the processing unit is configured to determine one or more symmetrical or approximately symmetrical signal area of the useful signal component or of the received signal, to fit the one or more symmetrical or approximately symmetrical signal area with a sinusoidal regression, a polynomial regression, a Gaussian regression or an exponential smoothing and to determine the local maximum in the symmetrically or approximately symmetrically fitted signal area.

10. The processing unit according to claim 8, wherein the processing unit is configured to determine the local maximum by means of peak value detection.

11. The processing unit according to claim 1, wherein the processing unit, based on the useful signal component or the interference signal component, determines a contamination or an imperfection of the rotary-driven tool or of the at least one cutting edge,
- wherein, if the processing unit determines a contamination, the processing unit provides information about a cleaning signal for cleaning the contaminated rotary-driven tool or the at least one cutting edge to the numerical controller of the machine tool,
- wherein, if the processing unit determines an imperfection, the processing unit provides information about a warning signal to the numerical controller of the machine tool.

12. The processing unit according to claim 1, wherein the rotary-driven tool has a plurality of cutting edges, which generate shadings of the light beam, wherein the light-receiving unit generates for each of the shadings an at least approximately proportional signal reproducing this.

13. The processing unit according to claim 12, wherein the processing unit is configured to identify the number of cutting edges based on useful signal components of the received signals and to provide information about the identified number of cutting edges to the numerical controller of the machine tool.

14. The processing unit according to claim 12, wherein the processing unit is configured to identify a shortest and a longest cutting edge based on useful signal components of the received signals and to provide information about the identified shortest and longest cutting edge to the numerical controller of the machine tool.

15. The processing unit according to claim 12, wherein the processing unit is configured to determine a concentricity error of the rotary-driven tool based on the identified shortest and longest cutting edge.

16. The processing unit according to claim 1, wherein the processing unit is configured to evaluate the useful signal components or the received signals via a concentricity analysis, frequency analysis, analysis of crest factors, single pulses or root mean square, RMS, power values and to provide key figures with regard to a state of a spindle or a spindle bearing of the machine tool to the numerical controller of the machine tool.

17. The processing unit according to claim 1, wherein the processing unit is configured to determine, using a reference tool, a signal curve comprising proportional signals at defined spindle speeds, and to evaluate the signal curve via a concentricity analysis, frequency analysis, analysis of crest factors, single pulses or root mean square, RMS, power values and to provide key figures with regard to a state of a spindle or of a spindle bearing of the reference tool to the numerical controller of the machine tool.

18. The processing unit according to claim 1, wherein the processing unit is configured to apply an autocorrelation function to the received signals for determining the useful signal components or interference signal components.

19. The processing unit according to claim 1, wherein the processing unit is configured to determine the interference signal component or the useful signal component based on an interruption rate, an interruption direction, an interruption depth, a shading threshold, a shading time per cutting edge, a speed, a number of cutting edges, an ambient air humidity, a period duration of a revolution, a periodicity of the received signal, a position or a tool type of the rotary-driven tool or of the at least one cutting edge and to provide information about the interference signal component or the useful signal component to the numerical controller of the machine tool.

20. A machine tool, comprising a processing unit for measuring and controlling a rotary-driven tool according to claim 1.

21. A processing unit for measuring and controlling a rotary-driven tool, wherein the processing unit is connectable to a light barrier arrangement, which comprises a light-transmitting unit and a light-receiving unit, wherein the processing unit is configured to receive from the light-receiving unit analog signals that are at least approximately proportional to shading generated by the rotary-driven tool or at least one cutting edge of the rotary-driven tool at a first measuring position;
- wherein the light barrier arrangement further comprises:
  - a first digital interface, which is configured to transmit status information of the light barrier arrangement to the processing unit and receive control signals from the processing unit;
  - a low-pass filter unit, which is configured to filter frequency components of the analog signals that are higher than a predetermined limit frequency;
  - a conversion unit, which is configured to convert the filtered analog signals into proportional filtered digital signals;

a second digital interface, which is configured to transmit the filtered digital signals to a processing unit;

wherein the processing unit is configured to evaluate the digital signals and to transmit control signals to the light barrier arrangement, wherein the evaluation of the signals received by the processing unit comprises the following steps:

determination of an interference signal component or a useful signal component of the received signal; and provision of information about the useful signal component, the interference signal component or the received signal for forwarding to a numerical controller of a machine tool.

22. The processing unit according to claim 21, wherein a sampling rate of the digital interface for sampling the filtered analog signal can be set to an interruption rate, an interruption direction, an interruption depth, a shading threshold, a shading time per cutting edge, a speed or a number of cutting edges of the rotary-driven tool or of the at least one cutting edge.

23. A processing unit for measuring and controlling a rotary-driven tool, wherein the processing unit is connectable to a light barrier arrangement, which comprises a light-transmitting unit and a light-receiving unit, wherein the processing unit is configured to receive from the light-receiving unit analog signals that are at least approximately proportional to shading generated by the rotary-driven tool or at least one cutting edge of the rotary-driven tool at a first measuring position;

wherein the light barrier arrangement further comprises:
a digital interface, which is configured to transmit status information of the light barrier arrangement to the processing unit and receive control signals from the processing unit;
an analog interface, which is connected parallel to the digital interface, which is configured to transmit the analog signals to a low-pass filter unit of the processing unit and receive control signals from the same;
wherein the low-pass filter unit is configured to filter frequency components of the analog signals that are higher than a predetermined limit frequency, and to transmit the filtered analog signals to a conversion unit of the processing unit;
wherein the conversion unit is configured to convert the filtered analog signals into proportional filtered digital signals, transmit the filtered digital signals to the processing unit and receive control signals from the processing unit;
wherein the processing unit is configured to evaluate the filtered digital signals and to transmit control signals, wherein the evaluation of the filtered digital signals received by the processing unit comprises the following steps:
determination of an interference signal component or a useful signal component of the received signal; and
provision of information about the useful signal components, the interference signal components and/or the received signal for forwarding to a numerical controller of a machine tool.

24. The processing unit according to claim 23, wherein a sampling rate of the digital interface or the conversion unit for sampling the analog signal can be set to an interruption rate, an interruption direction, an interruption depth, a shading threshold, a shading time per cutting edge, a speed or a number of cutting edges of the rotary-driven tool or of the at least one cutting edge.

25. A processing unit for measuring and controlling a rotary-driven tool, wherein the processing unit is integrated into a light barrier arrangement, which comprises a light-transmitting unit and a light-receiving unit, wherein the processing unit is configured to receive from the light-receiving unit signals that are at least approximately proportional to shading generated by the rotary-driven tool or at least one cutting edge of the rotary-driven tool at a first measuring position;

wherein the light barrier arrangement further comprises:
a communications unit, which is configured to transmit status information of the light barrier arrangement to the processing unit and receive control signals from the processing unit;
a low-pass filter unit, which is configured to filter frequency components of the analog signals that are higher than a predetermined limit frequency, and to transmit the filtered analog signals to a conversion unit of the processing unit;
wherein the conversion unit is configured to convert the filtered analog signals into proportional filtered digital signals, transmit the filtered digital signals to the processing unit and receive control signals from the processing unit;
wherein the processing unit is configured to evaluate the filtered digital signals and to transmit control signals, wherein the evaluation of the filtered signals received by the processing unit comprises the following steps:
determination of an interference signal component or a useful signal component of the received signal; and
provision of information about the useful signal components, the interference signal components or the received signal for forwarding to a numerical controller of a machine tool.

26. A method for measuring and controlling a rotary-driven tool, the method comprising the steps:
registration of shading generated by the rotary-driven tool or at least one cutting edge of the rotary-driven tool at a first measuring position;
generation of at least approximately proportional signals to the generated shading;
determination of an interference signal component or of a useful signal component from the received signal, including determining the useful signal component or the interference signal component repeatedly;
superposing of the repeatedly determined useful signal components or the repeatedly determined interference signal components;
application of a block filter to the superposed useful signal components or the superposed interference signal components;
determination of a representative value of the superposed useful signal components or the superposed interference signal components, to which the block filter was applied; and
provision of information about the useful signal component, the interference signal component or the signals for forwarding to a numerical controller of a machine tool, including provision of information about the representative value of the superposed useful signal components or the superposed interference signal components to the numerical controller of the machine tool.

27. The method according to claim 26, wherein a frequency or amplitude of the signal are predefined and the interference signal component or the useful signal component are determined based on the predefined frequency or amplitude.

28. The method according to claim 26, further comprising the steps:

comparison of the repeatedly determined useful signal components or the repeatedly determined interference signal components;

determination of a measuring position error based on the comparison of the repeatedly determined useful signal components or the repeatedly determined interference signal components;

determination of a second measuring position based on the measuring position error;

generation of an at least approximately proportional signal to the shading generated by the rotary-driven tool or the at least one cutting edge of the rotary-driven tool at the second measuring position.

29. The method according to claim 28, wherein the block filter is a median value filter, a minimum value filter, a maximum value filter, a mean value filter or a combination of these filters.

30. The method according to claim 26, further comprising the steps:

determination of a number of cutting edges or a form or length of the rotary-driven tool or of the at least one cutting edge based on the useful signal component, the interference signal component or the signal; and provision of information about the number of cutting edges or the form or or the length of the rotary-driven tool or of the at least one cutting edge to the numerical controller of the machine tool.

31. The method according to claim 30, wherein the step of determining the form or length of the rotary-driven tool or of the at least one cutting edge further comprises:

use of a predefined calibration function, which specifies a connection between shading generated by the rotary-driven tool or the at least one cutting edge and an associated at least approximately proportional signal.

32. The method according to claim 31, further comprising the step:

identification of the rotary-driven tool by comparison of the determined number of cutting edges or form or length of the rotary-driven tool with a predefined number of cutting edges or form or length of known tools.

33. The method according to claim 26, further comprising the steps:

determination of a local maximum of the shading, in order to determine a length of the rotary-driven tool or of the at least one cutting edge; and provision of information about the maximum of the shading to the numerical controller of the machine tool.

34. The method according to claim 33, wherein the determination of the local maximum of the shading further comprises:

determination of a symmetrical or approximately symmetrical signal area of the signal;

fitting with a sinusoidal regression, a polynomial regression, a Gaussian regression or an exponential smoothing of the symmetrical or approximately symmetrical signal area; and determination of the local maximum in the symmetrically or approximately symmetrically fitted signal area.

35. The method according to claim 33, wherein the local maximum is determined by means of peak value detection.

36. The method according to claim 26, further comprising the steps:

determination of a contamination or imperfection of the rotary-driven tool or of the at least one cutting edge based on the useful signal component or the interference signal component;

with the following steps, if a contamination is determined:

provision of information about the contamination of the rotary-driven tool or of the at least one cutting edge;

with the following steps if an imperfection is determined:

provision of information about the imperfection of the rotary-driven tool or of the at least one cutting edge.

37. The method according to claim 26, wherein the rotary-driven tool has a plurality of cutting edges, the method further comprising the steps:

registration of shadings generated by the plurality of cutting edges of the rotary-driven tool in the light beam;

generation of proportional signals to the shadings generated;

determination of interference signal components or useful signal components of the proportional signals.

38. The method according to claim 37, further comprising the step:

determination of the plurality of cutting edges of the rotary-driven tool based on the useful signal components of the proportional signals.

39. The method according to claim 37, further comprising the step:

determination of a shortest and a longest cutting edge of the rotary-driven tool based on the useful signal components of the proportional signals; and determination of a concentricity error based on the determined shortest and longest cutting edges of the rotary-driven tool if useful signal components or interference signal components of repeatedly received signals diverge from one another by a predetermined value.

40. The method according to claim 26, wherein the useful signal components or the signals are evaluated via a concentricity analysis, frequency analysis, analysis of crest factors, single pulse or root mean square, RMS, power values and key figures with regard to a state of a spindle or a spindle bearing of the machine tool are provided to the numerical controller of the machine tool.

41. The method according to claim 26, wherein, using a reference tool, a signal curve comprising proportional signals at defined spindle speeds is determined, the signal curve is evaluated via a concentricity analysis, frequency analysis, analysis of crest factors, single pulses or root mean square, RMS, power values and key figures with regard to a state of a spindle or of a spindle bearing of the reference tool are provided to the numerical controller of the machine tool.

42. The method according to claim 26, wherein the useful signal component, the interference signal component or the signal is determined by applying an autocorrelation function.

43. The method according to claim 26, wherein the useful signal component or the interference signal component is determined based on an interruption rate, an interruption direction, an interruption depth, a shading threshold, a shading time per cutting edge, a speed, a number of cutting edges, an ambient air humidity, a period duration of a revolution, a periodicity of the received signal, a position or a tool type of the rotary-driven tool or of the at least one cutting edge and the information about the useful signal component or the interference signal component is provided as information to the numerical controller of the machine tool.

* * * * *